US008756488B2

United States Patent
Meredith et al.

(12) United States Patent
(10) Patent No.: US 8,756,488 B2
(45) Date of Patent: *Jun. 17, 2014

(54) SYSTEMS AND METHODS FOR INTEGRATION OF AN APPLICATION RUNTIME ENVIRONMENT INTO A USER COMPUTING ENVIRONMENT

(75) Inventors: Matt Meredith, Santa Monica, CA (US); Aaron Robinson, San Diego, CA (US); Blake Machado, Coronado, CA (US); Damien Chavarria, Herepian (FR); Adrian Bourke, San Diego, CA (US)

(73) Assignee: Sweetlabs, Inc., San Diego, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/164,740

(22) Filed: Jun. 20, 2011

(65) Prior Publication Data

US 2011/0314389 A1 Dec. 22, 2011

Related U.S. Application Data

(60) Provisional application No. 61/356,513, filed on Jun. 18, 2010, provisional application No. 61/377,010, filed on Aug. 25, 2010.

(51) Int. Cl.
*G06F 17/00* (2006.01)

(52) U.S. Cl.
USPC .......................................................... 715/205

(58) Field of Classification Search
USPC .......................................... 715/200, 205, 700
See application file for complete search history.

(56) References Cited

U.S. PATENT DOCUMENTS

| | | | |
|---|---|---|---|
| 5,916,310 | A | 6/1999 | McCain |
| 6,018,343 | A | 1/2000 | Wang et al. |
| 6,094,671 | A | 7/2000 | Chase et al. |
| 6,216,141 | B1 | 4/2001 | Straub et al. |
| 6,327,628 | B1 | 12/2001 | Anuff et al. |
| 6,456,307 | B1 | 9/2002 | Bates et al. |

(Continued)

FOREIGN PATENT DOCUMENTS

| | | | |
|---|---|---|---|
| WO | 2006120280 | | 11/2006 |
| WO | 2011160139 | A1 | 12/2011 |
| WO | 2013074713 | A1 | 5/2013 |

OTHER PUBLICATIONS

Laufer, A Hike through Post-EJB J2EE Web Application Architecture, IEEE 2005, pp. 80-88.*

(Continued)

*Primary Examiner* — Cong-Lac Huynh
(74) *Attorney, Agent, or Firm* — KPPB LLP

(57) ABSTRACT

Systems and methods for creating application runtime environments or application environments that can be downloaded and integrated into the computing environment of a computing device are disclosed. One embodiment of the invention includes a computing device on which an operating system is installed that creates a computing environment, an Application Platform application, where the Application Platform application is at least partially natively implemented and creates an application runtime environment when executed by the computing device, and a cross-platform application, where the cross-platform application is configured to be executed within the application runtime environment and is not natively executable by the computing device. In addition, the Application Platform application is configured to integrate the cross-platform application into the computing environment of the computing device by providing at least one launch point for the cross-platform application within the computing environment.

40 Claims, 21 Drawing Sheets

30

32

(56) References Cited

U.S. PATENT DOCUMENTS 6,697,838 B1 2/2004 Jakobson
6,718,516 B1 4/2004 Claussen et al.
6,810,410 B1 10/2004 Durham
6,909,992 B2 6/2005 Ashley
6,992,589 B2 1/2006 Marsh
7,051,288 B2 5/2006 Bennett et al.
7,207,000 B1 4/2007 Shen et al.
7,272,786 B1 9/2007 McCullough
7,401,325 B2 7/2008 Backhouse et al.
7,614,018 B1 11/2009 Ohazama et al.
7,681,134 B1 3/2010 Grechishkin et al.
7,734,583 B2 6/2010 Vitanov et al.
7,925,988 B2* 4/2011 Abernethy et al. .......... 715/779
7,996,785 B2 8/2011 Neil
8,046,672 B2 10/2011 Hegde et al.
8,176,321 B1* 5/2012 Perry et al. .................... 713/167
8,209,598 B1* 6/2012 Pandey ......................... 715/205
8,260,845 B1 9/2012 Colton et al.
8,296,643 B1 10/2012 Vasilik
8,296,684 B2 10/2012 Duarte et al.
8,335,817 B1* 12/2012 Dayan .......................... 709/203
8,346,222 B2 1/2013 Zubas et al.
8,429,546 B2* 4/2013 Hilerio et al. ................ 715/760
8,434,135 B2* 4/2013 Hilerio et al. .................... 726/7
8,453,065 B2 5/2013 Chaudhrl et al.
8,458,612 B2 6/2013 Chatterjee et al.
8,555,155 B2 10/2013 Harrison et al.
8,566,697 B2 10/2013 Meredith et al.
2004/0081310 A1 4/2004 Lueckhoff
2004/0205531 A1* 10/2004 Innes et al. .................... 715/507
2004/0221170 A1 11/2004 Colvin et al.
2004/0268225 A1 12/2004 Walsh et al.
2005/0005234 A1 1/2005 Chen
2005/0102374 A1 5/2005 Moragne et al.
2005/0108678 A1* 5/2005 Goodwin et al. ............ 717/100
2005/0210412 A1* 9/2005 Matthews et al. ............ 715/835
2006/0005187 A1 1/2006 Neil
2006/0026438 A1* 2/2006 Stern et al. .................... 713/184
2006/0059422 A1 3/2006 Wu et al.
2006/0161631 A1 7/2006 Lira
2006/0224989 A1 10/2006 Pettiross et al.
2006/0265280 A1 11/2006 Nakada et al.
2007/0050777 A1 3/2007 Hutchinson et al.
2007/0255814 A1 11/2007 Green et al.
2007/0277109 A1 11/2007 Chen et al.
2008/0021696 A1 1/2008 Bartelt et al.
2008/0040226 A1 2/2008 Roker
2008/0082565 A1 4/2008 Chang et al.
2008/0108333 A1 5/2008 Jemison et al.
2008/0140529 A1 6/2008 Agarwal et al.
2008/0154718 A1 6/2008 Flake et al.
2008/0172736 A1 7/2008 Barr et al.
2008/0208589 A1 8/2008 Cross et al.
2008/0256636 A1* 10/2008 Gassoway ...................... 726/24
2009/0019371 A1 1/2009 Audet
2009/0019436 A1 1/2009 Hartz et al.
2009/0070228 A1* 3/2009 Ronen ............................ 705/26
2009/0077174 A1 3/2009 Janssen et al.
2009/0125833 A1 5/2009 Abernethy et al.
2009/0132556 A1* 5/2009 Gupta et al. .................. 707/100
2009/0171974 A1* 7/2009 Arthursson et al. ............ 707/10
2009/0171993 A1 7/2009 Arthursson
2009/0187928 A1* 7/2009 Mark ........................... 719/329
2009/0217179 A1 8/2009 Mons et al.
2009/0249238 A1 10/2009 Chudy et al.
2009/0271394 A1 10/2009 Allen et al.
2009/0282333 A1 11/2009 Olsen et al.
2010/0017701 A1 1/2010 Bargeron
2010/0023884 A1 1/2010 Brichford et al.
2010/0054128 A1 3/2010 O'Hern
2010/0114887 A1 5/2010 Conway et al.
2010/0146529 A1 6/2010 Heath et al.
2010/0211906 A1 8/2010 Kanai
2010/0228594 A1 9/2010 Chweh et al.
2010/0306762 A1* 12/2010 Lindberg et al. ............. 717/176
2011/0016169 A1 1/2011 Cahill et al.
2011/0055005 A1 3/2011 Lang
2011/0093900 A1 4/2011 Patel et al.
2011/0138295 A1* 6/2011 Momchilov et al. .......... 715/740
2011/0138314 A1* 6/2011 Mir et al. ...................... 715/779
2011/0153806 A1 6/2011 Bagasra
2011/0289422 A1* 11/2011 Spivack et al. ................ 715/739
2011/0307738 A1 12/2011 Hilerio et al.
2011/0307880 A1 12/2011 Hilerio et al.
2011/0307883 A1 12/2011 Hilerio et al.
2011/0307946 A1* 12/2011 Hilerio et al. .................... 726/7
2011/0314389 A1 12/2011 Meredith et al.
2012/0005346 A1 1/2012 Burckart et al.
2012/0030617 A1 2/2012 Louch
2012/0047442 A1 2/2012 Nicolaou et al.
2012/0066583 A1 3/2012 Priestley et al.
2012/0066634 A1 3/2012 Kim et al.
2012/0084713 A1* 4/2012 Desai et al. ................... 715/788
2012/0096396 A1 4/2012 Ording et al.
2012/0150963 A1 6/2012 Horowitz et al.
2012/0151368 A1* 6/2012 Tam ............................. 715/738
2012/0166956 A1 6/2012 Hilerio et al.
2012/0166959 A1* 6/2012 Hilerio et al. ................ 715/738
2012/0173312 A1 7/2012 Kern
2012/0174075 A1 7/2012 Carteri et al.
2012/0233243 A1* 9/2012 Ashkenazy et al. .......... 709/203
2012/0235912 A1 9/2012 Laubach
2012/0266186 A1* 10/2012 Parzygnat et al. ............ 719/320
2012/0290919 A1 11/2012 Melnyk et al.
2012/0296959 A1* 11/2012 Momchilov et al. .......... 709/203
2012/0297291 A1 11/2012 Fainberg et al.
2012/0297377 A1* 11/2012 Chen et al. .................... 717/176
2012/0311419 A1* 12/2012 Kwak et al. ................... 715/205
2012/0324338 A1 12/2012 Meredith et al.
2013/0024763 A1 1/2013 Nemati et al.
2013/0073401 A1 3/2013 Cook
2013/0111341 A1 5/2013 Bier
2013/0124211 A1 5/2013 McDonough
2013/0124557 A1 5/2013 Goode et al.
2013/0145348 A1* 6/2013 Agovic et al. ................ 717/120
2013/0173319 A1 7/2013 Thomas et al.
2013/0197972 A1 8/2013 Taguchi et al.
2013/0246906 A1 9/2013 Hamon
2013/0262168 A1 10/2013 Makanawala et al.
2013/0268837 A1* 10/2013 Braithwaite et al. .......... 715/234
2013/0290879 A1 10/2013 Greisson
2013/0304581 A1 11/2013 Soroca et al.
2014/0053107 A1 2/2014 Patel

OTHER PUBLICATIONS

Lee et al., Integrating Service Composition Flow with User Interactions, IEEE 2008, pp. 103-108.*

Heino et al., Developing Semantic Web Applications with the OntoWiki Framework, Springer 2009, pp. 61-77.*

Oren, SemperWiki: a Semantic Personal Wiki, Google 2005, pp. 1-16.*

International Search Report for International Application PCT/US2011/041129, Report completed Sep. 22, 2011; 3 pgs.

Written Opinion Report for International Application PCT/US2011/041129, Report completed Sep. 22, 2011; 12 pgs.

"How to Use the Remote Shutdown Tool to Shut Down and Restart a computer in Windows 2000," published Jul. 5, 2006, pp. 1-2, printed from http://support.microsoft.com/kb/317371.

International Search Report and Written Opinion for International Application No. PCT/US2012/65136, International Filing Date Nov. 14, 2012, Search Completed Jan. 29, 2013, Mailed Feb. 8, 2013, 7 pgs.

International Search Report for International Application No. PCT/US2009/36069, date completed Jun. 23, 2009, date mailed Jul. 7, 2009, 3 pgs.

Written Opinion of the International Searching Authority for International Application No. PCT/US2009/36069, date completed Jun. 27, 2009, date mailed Jul. 7, 2009, 5 pgs.

Mikkonen, et al., "Towards a Uniform Web Application Platform for Desktop Computers and Mobile Devices", ACM, 2008, pp. 1-29.

Stearn, "XULRunner: A New Approach for Developing Rich Internet Applications", IEEE, 2007, pp. 67-73.

(56) References Cited

OTHER PUBLICATIONS

Sugawara, et al., “A Novel Intuitive GUI Method for User-friendly Operation”, Google 2009, 235-246.
International Search Report and Written Opinion for International Application No. PCT/US2013/052861, mailed Feb. 21, 2014, 8 pgs.
International Search Report and Written Opinion for International Application No. PCT/US2013/057087, mailed Mar. 19, 2014, 10 pgs.
Sen et al., “Feed Me: A Collaboration Alert Filtering System,” ACM 2006, pp. 89-98.

* cited by examiner

SYSTEMS AND METHODS FOR INTEGRATION OF AN APPLICATION RUNTIME ENVIRONMENT INTO A USER COMPUTING ENVIRONMENT

CROSS-REFERENCE TO RELATED APPLICATION

The present invention claims priority under 35 U.S.C. §119 (e) to U.S. Provisional Patent Application No. 61/356,513 entitled "SYSTEMS AND METHODS FOR ENHANCING WEB APPLICATION FUNCTIONALITY AND USER EXPERIENCE", filed Jun. 18, 2010, and U.S. Provisional Patent Application No. 61/377,010 entitled "SYSTEMS AND METHODS FOR INTEGRATION OF APPLICATIONS CREATED USING WEB TECHNOLOGIES INTO A USER COMPUTING ENVIRONMENT", filed Aug. 25, 2010. The disclosures of U.S. Provisional Patent Application Nos. 61/356,513 and 61/377,010 are incorporated by reference herein in their entirety.

FIELD OF THE INVENTION

The present invention relates generally to application runtime environments and more specifically to systems and methods for integrating applications into the user computing environment of different classes of computing devices.

BACKGROUND OF THE INVENTION

The term desktop application is typically used to distinguish applications that are resident on a computing device and are designed to execute within a particular operating system from web applications, which are typically applications that are temporarily downloaded via the Internet for execution by a browser application, often using a virtual machine, that is resident on a computing device. While a desktop application is typically natively implemented (i.e. compiled into the machine code of the computing device on which it resides), web applications execute within a browser-controlled runtime environment (e.g. a Java applet) or are written in a browser-supported language (such as HyperText Markup Language (HTML), JavaScript and Cascading Style Sheets (CSS)). As such Web applications are cross-platform (i.e. not native to a specific computing device), relying upon the ubiquity of natively implemented web browser applications to enable the execution of the web application on a variety of computing devices/platforms.

Web applications are typically confined to the web browser application that calls the web application. In many instances, a user cannot receive notifications from a web application unless the user has the web application open in the user's browser application. Therefore, a user can miss significant notifications from the web application by navigating away from the web application. Efforts have been made to reduce the extent to which alerts are bound to a specific web page. Many web browsers provide a framework within which extensions can be created to enable a web application to interact with a user when the user does not have the web application open in the browser. The Extensions beta for the Chrome web browser, developed by Google Inc. of Mountain View, Calif. is one such example. Using the Extensions framework, a web developer can create an Extension to the Chrome web browser that enables a web application to interact with a user irrespective of the user's browsing activity. The Extensions framework is specifically designed to enable the creation of Extensions using web technologies like HTML, JavaScript and CSSs with a few extra Extension Application Programming Interfaces (APIs). While Extensions free a web application from being bound to a specific web page, Extensions typically require a user to have a specific browser open. Therefore, web browser extensions have a tendency to bind a web application to a specific browser application.

A number of dedicated or natively implemented desktop applications have been developed to complement the functionality of web applications. The same technologies that are used to create web applications (such as the HTML, JavaScript, and CSS technologies used to create Chrome Extensions) typically cannot be used to create desktop applications. Therefore, the creation of a desktop application to complement a web application can constitute a completely separate development process. In addition, modifications to a web application can often necessitate significant modifications to the desktop application resulting in the need for a user to perform frequent updates of the desktop application to ensure its ability to continue to function. As such, there are very few desktop applications that have been created to complement web applications.

Adobe Integrated Runtime (also known as Adobe AIR), distributed by Adobe Systems Incorporated, is a cross-platform runtime environment for budding Internet applications using Adobe Rash, Adobe Rex, HTML or Ajax that can be deployed as desktop applications. An application deployed with AIR requires the application be packaged, digitally signed, and installed on the user's local file system. This provides access to local storage and file systems, while browser-deployed applications are more limited in where and how data can be accessed and stored. In order to interact with native processes, Adobe AIR 2 applications can be packaged and delivered via a native installer application. Such applications have the ability to launch and communicate with native processes, using the ActionScript NativeProcess class. The NativeProcess class provides command line integration and general launching capabilities. The NativeProcess class lets an AIR application execute native processes on the host operating system and the AIR application can monitor the standard input and output stream of the process as well as the process's standard error stream. Adobe AIR applications that are delivered by a native installer application are referred to as extended desktop profile applications and the native installer application is specific to a particular operating system.

Many operating systems facilitate the creation of a custom computing environment to increase the efficiency of a user's task completion. For example, a computing environment can include a desktop graphical user interface having desktop icons and/or a task bar, which are configurable by a user to enable the launching of specific desktop applications of importance to the user. By contrast, accessing a web application typically involves a user launching a browser or opening a new tab or browser window, and navigating to the web applications. In many instances, the user must also sign in to the web application.

In general, integration between traditional desktop applications, computing environments and web applications is poor. Web applications are typically confined to the web browser application that calls the web application. While web browsers may do significant work to integrate access to the browser itself, little attention is typically paid to integrating applications that live within the browser with desktop applications or a user's computing environment in general. The end user is often in a situation where task completion is hindered by the lack of robust integration of web applications with the rest of the user's computing environment. For example, features such as the "cutting and pasting" of complex data between web applications and desktop applications are generally absent or incomplete.

SUMMARY OF THE INVENTION

Users typically do not care about where data, content, and applications are resident. Instead, users are more concerned with completing specific tasks. Therefore, systems and methods in accordance with embodiments of the invention create an application runtime environment or application environment that can be downloaded and integrated into the computing environment of a computing device, where the application environment enables users to access, manage, and discover cross-platform applications that are integrated within the computing environment of the computing device, but execute within the application environment. In this way, the application environment provides a common development platform for developers similar to the manner in which browser applications and associated standard web technologies such as HTML5, JavaScript, and CSS provide a common platform for web applications. The application environment, however, enables the cross-platform applications to extend beyond a specific web browser application, enabling the cross-platform applications executing within the application environment to integrate into the computing environment of the device in a similar way to the manner in which natively implemented desktop applications can integrate with the computing environment provided by the device's operating system. In this way, an application environment in accordance with embodiments of the invention can simplify the development of cross-platform applications for deployment on multiple operating systems and computing devices in a way that also facilitates user task completion within the user's computing environment.

In addition to providing developers with a common development platform, the application environment provides users with a common platform to access, manage, and discover applications across a range of computing devices. Once installed, application environments in accordance with many embodiments of the invention include mechanisms that facilitate the discovery of new applications that can further enhance user task completion. In addition, the application environment can facilitate the automatic updating of the cross-platform applications and/or the application environment to enforce consistency between the cross-platform applications installed on a user computing device and updates to remote servers and/or APIs utilized by the applications.

One embodiment of the invention includes a computing device on which an operating system is installed that creates a computing environment, an Application Platform application, where the Application Platform application is at least partially natively implemented and creates an application runtime environment when executed by the computing device, and a cross-platform application, where the cross-platform application is configured to be executed within the application runtime environment and is not natively executable by the computing device. In addition, the Application Platform application is configured to integrate the cross-platform application into the computing environment of the computing device by providing at least one launch point for the cross-platform application within the computing environment.

In a further embodiment, the computing environment is a desktop computing environment that includes a task bar, and at least one launch point is an icon in the taskbar of the desktop computing environment.

In another embodiment, the Application Platform application is configured to communicate with the operating system to add a badge to the at least one launch point for the cross-platform application within the desktop computing environment, and the cross-platform application executing within the runtime environment is configured to utilize the Application Platform application to add a badge notification to the launch point for the cross-platform application within the desktop computing environment.

In a still further embodiment, the Application Platform application is configured to render pop up notifications within the desktop computing environment, and the cross-platform application executing within the runtime environment is configured to utilize the Application Platform application to generate a pop up notification.

In a yet further embodiment, the Application Platform is configured to render pop up notifications in which the pop up notification contains a web page rendered by a chromeless web browser application, and the cross-platform application executing within the runtime environment is configured to utilize the Application Platform application to generate a pop up notification containing a web page rendered by the chromeless web browser.

In yet another embodiment, the Application Platform application is configured to monitor URL changes in the chromeless web browser and to extract an access token from one of the URLs returned to the chromeless web browser by a remote server, and the Application Platform application is configured to locally store the access token.

In a further embodiment again, the computing device includes a processor and non-volatile storage and the Application Platform application and the cross-platform application are stored in the non-volatile storage of the computing device.

In another embodiment again, the Application Platform application is configured to continuously execute the cross-platform application.

In a further additional embodiment, the Application Platform application is configured to display a listing of cross-platform applications that can be installed on the computing device.

In another additional embodiment, the Application Platform application is configured to execute a cross-platform application to display the listing of cross-platform applications that can be installed on the computing device.

In a still yet further embodiment, the Application Platform application is configured to coordinate the installation of a second cross-platform application on the computing device.

In still yet another embodiment, the Application Platform application is configured to verify the authenticity of the cross-platform application with a verification server prior to installing the second cross-platform application.

In a still further embodiment again, the Application Platform application is configured to verify itself with a verification server.

In still another embodiment again, the Application Platform application is configured to disable itself when instructed to by the verification server.

In a still further additional embodiment, the Application Platform application is configured to initiate the installation of an updated version of the Application Platform application when instructed to by the verification server.

In still another additional embodiment, the Application Platform application is configured to verify the cross-platform application with a verification server.

In a yet further embodiment again, the Application Platform application is configured to disable the cross-platform application when instructed to by the verification server.

In yet another embodiment again, the Application Platform application is configured to initiate the installation of an updated version of the cross-platform application when instructed to by the verification server.

In a yet further additional embodiment, the Application Platform application is configured to enable cross-platform applications executing within the runtime environment to access local storage.

In yet another additional embodiment, each cross-platform application has its own storage domain in local storage.

In a further additional embodiment again, the cross-platform application includes a file containing the logic of the cross-platform application in a scripting language configured to be executed within the application runtime environment created by the Application Platform application, and at least one file containing instructions for rendering a pop up notification in a rendering language configured to be rendered by the Application Platform application.

In another additional embodiment again, the Application Platform application includes a rendering engine process configured to implement the logic of the cross-platform application and to render the pop up notification, and an integration process configured to enable the cross-platform application to communicate with operating system processes.

In a still yet further embodiment again, the integration process is further configured to enable the cross-platform application to communicate with natively implemented processes executing on the computing device.

In still yet another embodiment again, the integration process is configured to expose APIs that enable the cross-platform application to make modifications to the computing environment.

In a still yet further additional embodiment, the cross-platform application further comprises an image file containing an icon, and the Application Platform application is configured to display the icon as a launch point within the computing environment of the computing device.

In still yet another additional embodiment, the Application Platform application is configured to apply a badge to the icon launch point in response to instructions in the file containing the logic of the cross-platform application.

In a yet further additional embodiment again, the Application Platform application is configured to apply a badge to the icon launch point in response to instructions in one of the at least one files containing instructions for rendering a pop up notification.

In yet another additional embodiment again, the Application Platform is configured to render pop up notifications in which the pop up notification contains a web page rendered by a chromeless web browser application, and the cross-platform application executing within the runtime environment is configured to pass a URL to the Application Platform application to render a pop up notification containing a web page rendered by the chromeless web browser using the URL.

In a still yet further additional embodiment again, the Application Platform application is configured to monitor URL changes in the chromeless web browser and to extract an access token from one of the URLs returned to the chromeless web browser by a remote server, and the Application Platform application is configured to locally store the access token.

In still yet another additional embodiment again, the Application Platform application is configured to enable cross-platform applications executing within the runtime environment to access local storage.

In another further embodiment, the file containing the logic of the cross-platform application and the at least one file containing instructions for rendering a pop up notification share a local storage context when executed by the Application Process application.

In still another further embodiment, the Application Platform process is configured to generate a hash from at least one of the file containing the logic of the cross-platform application and the at least one file containing instructions for rendering a pop up notification and to provide the hash to a verification server.

In yet another further embodiment, the Application Platform application is configured to disable the cross-platform application in response to an instruction from the verification server.

In another further embodiment again, the Application Platform application is configured to initiate installation of an updated version of the cross-platform application in response to an instruction from the verification server.

In another further additional embodiment, the Application Platform application is configured to coordinate data transfer between an application executing within the computing environment of the computing device and a web application via a coordination server.

In still yet another further embodiment, the Application Platform application is configured to configure the computing environment of the computing device by coordinating the installation of a plurality of cross-platform applications in response to instructions from a verification server.

An embodiment of the method of the invention includes downloading an installation package including a file containing logic for a cross-platform application in a scripting language configured to be executed within an application runtime environment created by an Application Platform application installed on the computing device, and at least one file containing instructions for rendering a pop up notification in a rendering language configured to be rendered by the Application Platform application, and saving the file containing the logic of the cross-platform application and the at least one file containing instructions for rendering a pop up notification to non-volatile storage on the computing device.

In a further embodiment of the method of the invention the installation package comprises a header and a compressed payload and the header includes a public key and a digital signature for the package and the compressed payload comprises the file containing logic for the cross-platform application and the at least one file containing instructions for rendering a pop up notification.

Another embodiment of the method of the invention also includes verifying the authenticity of the installation package using the public key and the digital signature.

In a still further embodiment of the method of the invention, the compressed payload further comprises a manifest file including the same public key as the public key in the header of the installation package.

In still another embodiment of the method of the invention the installation package further comprises an icon image file configured to be displayed by the Application Platform applications as an icon launch point within the computing environment of the computing device.

A yet further embodiment of the method of the invention, includes displaying a launch point within a computing environment generated by the operating system of a computing device, executing instructions in a locally stored file containing the logic of a cross-platform application in response to user selection of the launch point using an Application Platform application installed on the computing device, where the instructions are in a scripting language that is not natively executable and at least a portion of the Application Platform is natively implemented; and rendering a pop up notification using the Application Platform using a file containing instructions for rendering a pop up notification and in response to instructions within the locally stored file containing the logic of the cross-platform application, where the instructions are in a rendering language that is not natively executable.

In yet another embodiment of the invention, the Application Platform application performs an operating system call to display the launch point within the computing environment generated by the operating system of the computing device.

A further embodiment again of the method of the invention also includes performing an operating system call using the Application Platform application to apply a badge to the launch point within the computing environment generated by the operating system of the computing device in response to execution by the Application Platform application of instructions within at least one of: the locally stored file containing the logic of the cross-platform application; and file containing instructions for rendering a pop up notification.

Another embodiment again of the method of the invention includes storing data in local storage in response to execution by the Application Platform application of instructions within at least one of: the locally stored file containing the logic of the cross-platform application; and file containing instructions for rendering a pop up notification, and retrieving data in local storage response to execution by the Application Platform application of instructions within at least one of: the locally stored file containing the logic of the cross-platform application; and file containing instructions for rendering a pop up notification.

DETAILED DISCLOSURE OF THE INVENTION

Figure 1:
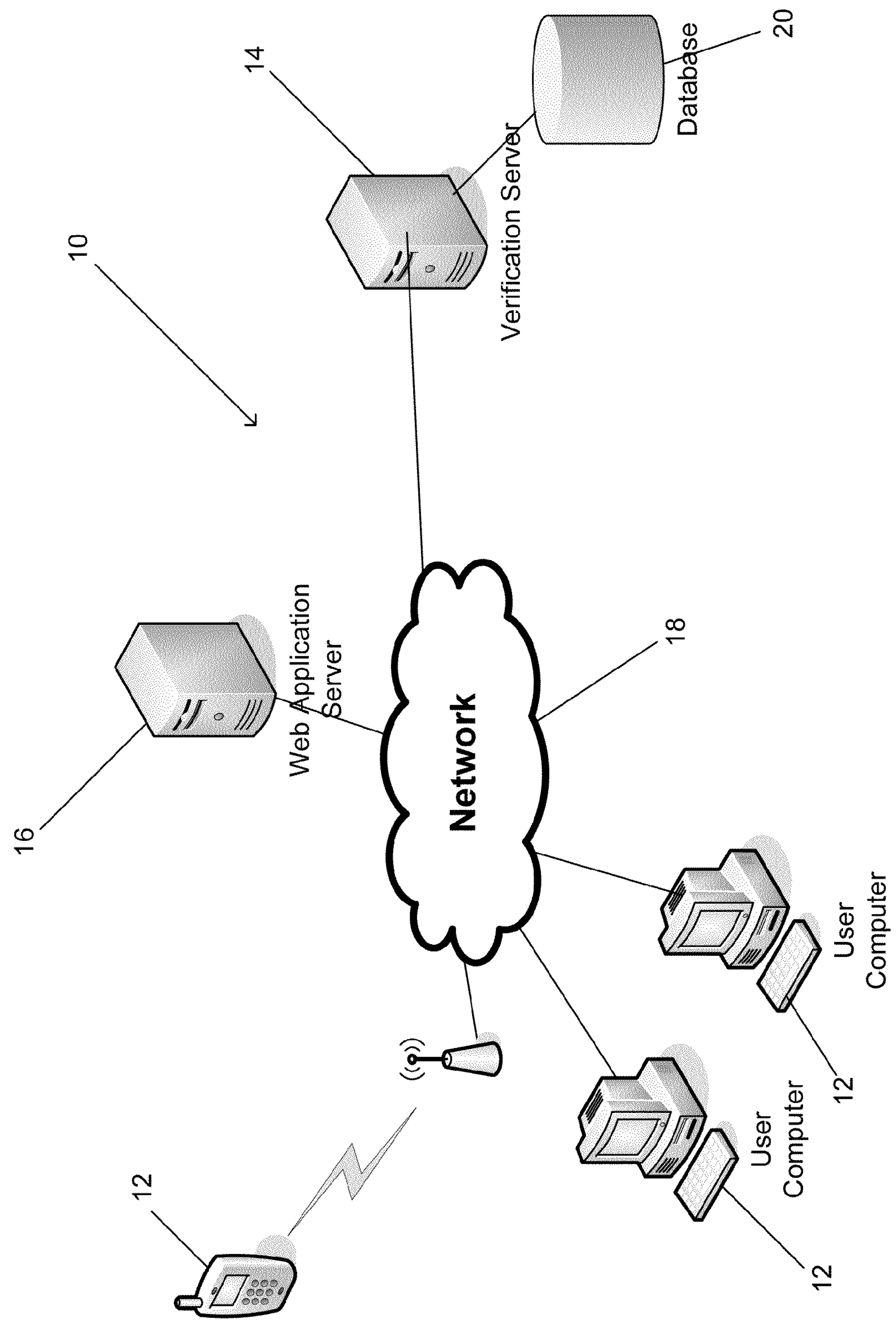
FIG. 1 is a network diagram illustrating computing devices on which Application Platforms are installed that enable cross-platform applications installed on the computing devices to communicate with web servers and verification servers via the Internet in accordance with an embodiment of the invention.
Figure 2A:
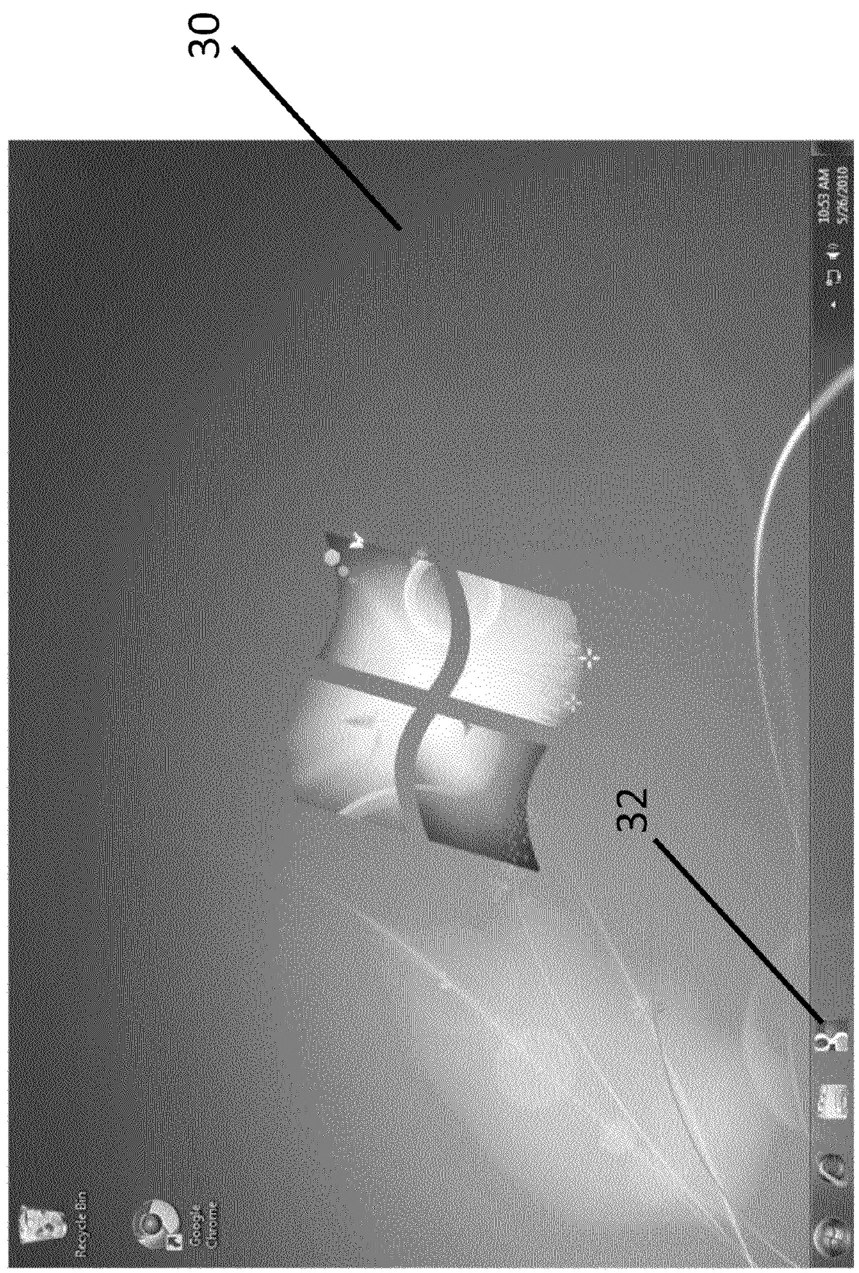
FIGS. 2*a*-2*d* conceptually illustrate the operation of an Internet search cross-platform application in accordance with an embodiment of the invention.
Figure 2B:
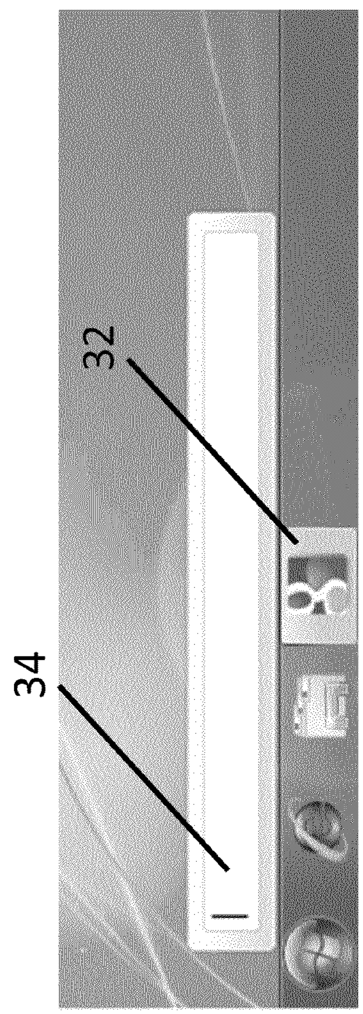
Figure 2C:
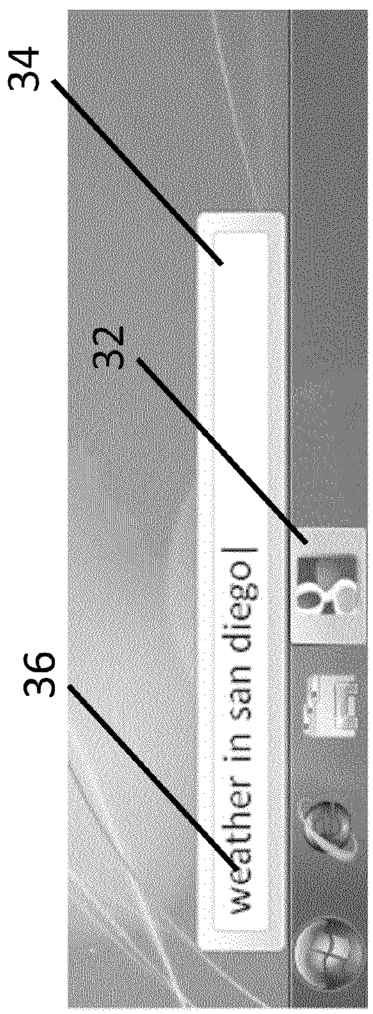
Figure 2D:
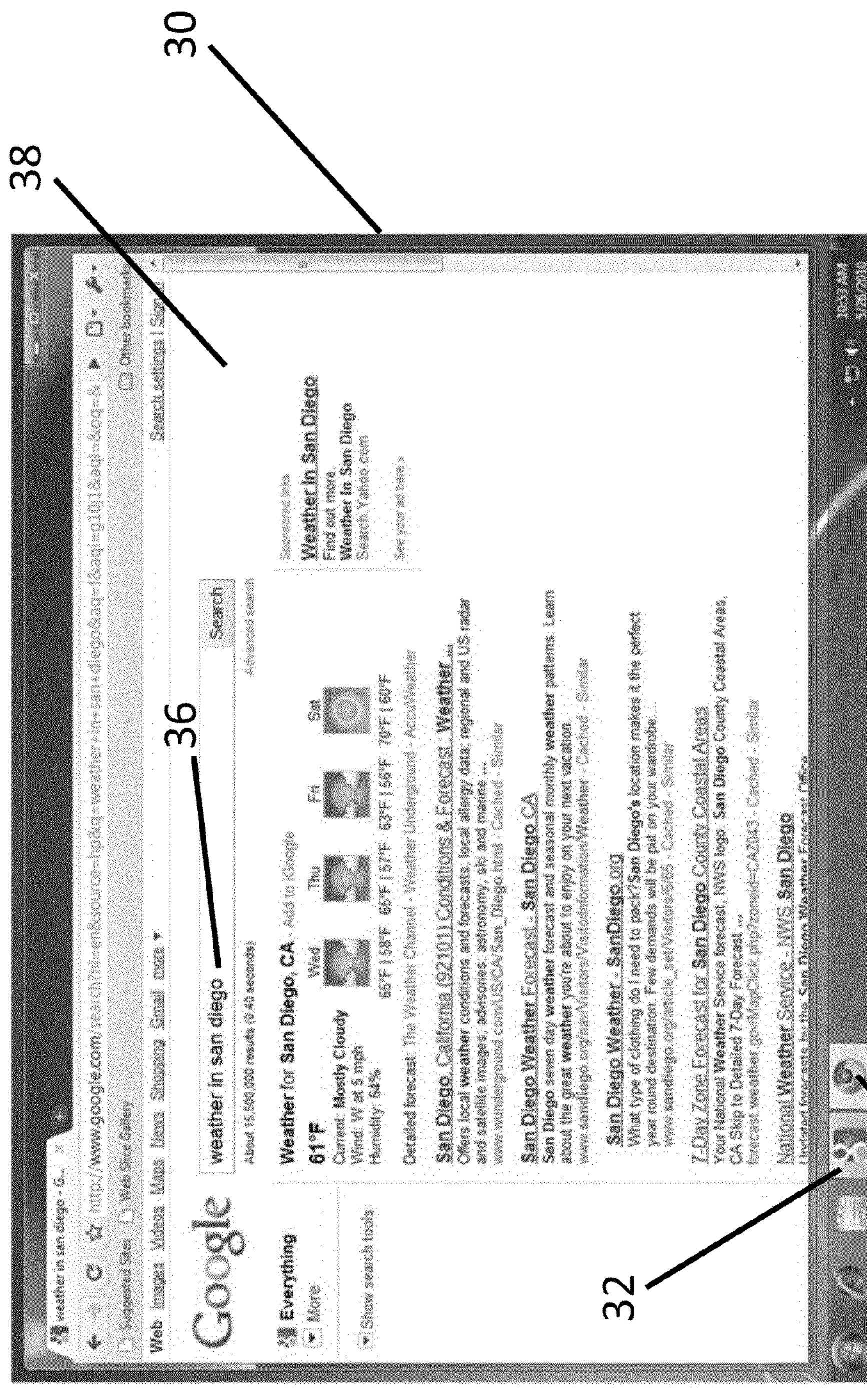
Figure 2E:
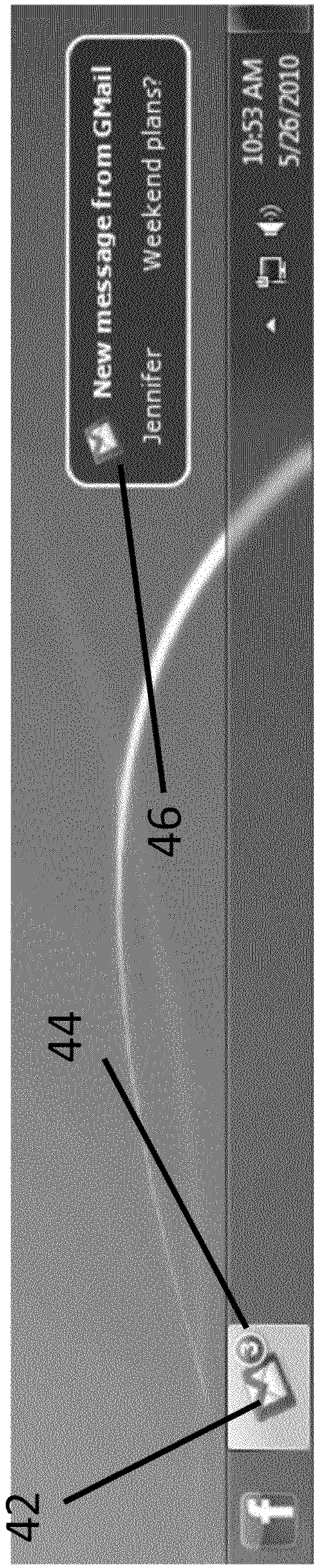
FIG. 2*e* conceptually illustrates the notifications generated by a web mail cross-platform application in accordance with an embodiment of the invention.

Turning now to the drawings, systems and methods for creating application runtime environments or application environments that can be downloaded and integrated into the computing environment of a computing device are illustrated. The application environment is natively implemented and provides an intuitive interface that is integrated with the computing environment of a device's operating system, which enables the user to access, organize and discover cross-platform applications that execute within the application environment. The application runtime environment also provides mechanisms by which the cross-platform applications can communicate with native processes including operating system processes. In several embodiments, the application environment is implemented using a native application referred to as an Application Platform, and the cross-platform applications are not natively implemented, but instead are implemented to be executed by the Application Platform. The Application Platform enables the integration of the cross-platform applications with the user's desktop computing environment. For example, the cross-platform application can have launch points within the user's computing environment (e.g. desktop icons, taskbar icons) and can provide notifications in ways including but not limited to updating a desktop or taskbar icon by applying badges to the icon. A launch point is a feature of the computing environment of the computing device that enables a user to launch an application or bring the user interface of the application to the foreground. In the context of cross-platform applications, in many embodiments the cross-platform applications are continuously executed by the Application Platform process and a launch point within the computing environment provides a mechanism for the user to bring the user interface of the cross-platform application to the foreground and/or to prompt the cross-platform application to provide notifications.

In several embodiments, the cross-platform applications are implemented using web technologies including but not limited to HTML, JavaScript, and/or CSSs and the Application Platform is implemented using the combination of a rendering engine layer and an integration layer. The rendering engine layer is able to perform all of the functions of the rendering engine of a web browser, enabling execution of cross-platform applications implemented using web technologies in a similar way to the manner in which web applications execute within a web browser application, i.e. without the need for a user to launch a web browser application. The cross-platform applications are, however, not constrained in the way that web applications are typically constrained to specific web browser instances. The integration layer enables the integration of the application with the user's desktop computing environment and communication with natively implemented processes to provide functionality including (but not limited to) desktop launch points and notifications based upon data pulled from remote servers by the application. Although cross-platform applications and the Application Platform application can be implemented in accordance with embodiments of the invention so that the cross-platform applications are implemented using technologies similar to those utilized by web applications, the application runtime environment created by the Application Platform application can enable the creation and execution of cross-platform applications built using any of a variety of technologies (i.e. not limited to the technologies utilized by web applications).

A challenge faced by many natively implemented desktop applications that complement the functionality of web applications is ensuring that the desktop applications are updated as the functionality of the web application is modified. In many embodiments, a verification server is provided that verifies that the Application Platform application and the cross-platform applications installed on a computing device are valid and up to date. In this way, updates and security fixes to the application runtime environment and the cross-platform applications can be regularly pushed to user computing devices to enforce consistency between the functionality of the application run time environment, the functionality of the cross-platform applications, and the functionality of any remote servers with which the cross-platform applications communicate. In several embodiments, the verification server also detects attempts to tamper with the Application Platform application and/or cross-platform applications installed on a computing device and can disable the Application Platform and/or any cross-platform application that cannot be verified.

In many embodiments, the verification server can also act as a centralized store of user data and/or configuration data, a distribution point for software upgrades, and/or support any other functionality of the Application Platform application that does not require direct embedding on the user's computing environment. The ability of the verification server to store user profiles also enables many embodiments of the invention to automatically configure the computing environment of a new computing device.

In several embodiments, data exchange between Application Platforms, cross-platform applications, desktop applications, and web applications located on one or more devices and/or servers can also be facilitated with the use of a coordination server. In many embodiments, the coordination server intercepts complex data and translates the data to enable movement of the data between applications that execute within a native computing environment (e.g. desktop applications, and cross-platform applications) and web applications.

The creation of application runtime environments using Application Platform applications, the downloading, installation and execution of cross-platform applications within the application runtime environment, and the various server systems that can be utilized to enhance the application runtime environment and the cross-platform applications that execute within it are discussed below.

1. System Architecture

A system in which computing devices download cross-platform applications from remote servers for execution within application runtime environments installed on the computing devices in accordance with an embodiment of the invention is illustrated in FIG. 1. The system 10 includes a plurality of computing devices 12 on which Application Platform applications are installed that create an application runtime environment on each device. Each computing device can download one or more cross-platform applications that execute within the application runtime environment from one or more verification servers 14 or one or more web servers 16 via the Internet 18. In addition to providing access to new applications, the verification server(s) coordinate the updating and validation of the Application Platform application and cross-platform applications installed on the computing devices and any new cross-platform applications requested by the computing devices. When executed, the cross-platform applications can cause the computing device 12 to interact with the web servers 16. In this way, the cross-platform applications can extend the functionality of web applications to the desktop of the computing device.

Although the illustrated embodiment shows computing devices 12 that are personal computers and mobile devices, Application Platform applications can be installed to create an application runtime environment on any of a number of different computing devices that are capable of downloading applications for execution including but not limited to tablet computers, game consoles, televisions, and other Internet connected consumer electronics devices. The implementation of Application Platform applications, and cross-platform applications in accordance with various embodiments of the invention is discussed further below.

2. Application Platforms

Application Platform applications implemented in accordance with embodiments of the invention create an application runtime environment that enables the integration of cross-platform applications with the user's desktop computing environment. For example, the cross-platform application can have launch points within the user's computing environment (e.g. desktop icons, taskbar icons), can provide notifications in ways including but not limited to updating a desktop or taskbar icon by applying badges to the icon, and can generally enable cross-platform applications to communicate with native processes. In this way, the application environment provides a common development platform for developers similar to the manner in which browser applications and associated standard web technologies such as HTML5, JavaScript, and CSS provide a common platform for web applications. Indeed, as is discussed further below, Application Platform applications in accordance with embodiments of the invention can be implemented that enable the creation and execution of cross-platform applications using the same technologies used to implement web applications.

In many embodiments, the Application Platform enables the integration of cross-platform applications into the computing environment of a user device by exposing a number of APIs that can be called to make modifications to a user's computing environment and/or communicate with operating system processes (or other native processes). In the context of a personal computer, a user's computing environment is typically a desktop and Application Platform applications can be installed on personal computers that enable cross-platform applications to modify the desktop computing environment. Various examples of the way in which cross-platform applications can be implemented with a desktop computing environment in accordance with embodiments of the invention are discussed further below. Application Platform applications can also be implemented for installation on other classes of device such as (but not limited to) mobile phones, tablet computers, game consoles, Internet connected televisions and/or consumer electronics devices that do not utilize desktop computing environments.

When the Application Platform application is running, each cross-platform application is continuously active and can continuously communicate with remote servers via the Internet to obtain additional information and updates. Utilizing the integration with the user's computing environment provided by the Application Platform, the cross-platform applications can continuously provide updates based upon information retrieved from the remote servers. In this way, the cross-platform applications can be used to extend web applications and web services to a user's computing environment.

3. Integration of Cross-Platform Applications with Desktop Computing Environments A desktop computing environment typically includes desktop shortcuts, favorites, taskbar icons, and/or a start menu that facilitate functions including but not limited to the launching of desktop applications and the provision of notifications by desktop applications. In many embodiments, the Application Platform enables a cross-platform application to behave within the computing environment as if it is a conventional natively implemented desktop application. For example, the Application Platform application can enable icons for cross-platform applications to be included in the task bar and/or the start menu of the computing environment. The Application Platform can also facilitate notifications by the cross-platform applications through the application of badges to the icons. In many embodiments, the Application Platform application also enables the cross-platform application to create desktop shortcuts to launch the cross-platform application and can provide shell support for the application enabling the application or a web application associated with the application to be associated with specific file types. In several embodiments, the cross-platform is able to behave as if it is a conventional natively implemented desktop application, because the Application Platform application provides mechanisms by which the cross-platform application can communicate with operating system processes and/or other natively implemented processes.

The manner in which an Application Platform application can integrate a cross-platform application with a desktop computing environment in accordance with an embodiment of the invention is illustrated in FIGS. 2_a_-2_d_. The illustrated cross-platform application extends the functionality of the Google search engine web service provided by Google, Inc. of Mountain View, Calif. to the desktop of the computing device. The cross-platform application receives a search query, provides the query to one of the Google search engine servers and launches a browser application to display search results using a URL returned by the search engine servers. For simplicity, the cross-platform application is referred to as the Google search application. As can be readily appreciated any of a number of different applications can be implemented in accordance with an embodiment of the invention and the Google search application illustrated in FIGS. 2_a_-2_d_ was simply chosen as one example.

The integration of the Google search application into the user's computing environment by the Application Platform application can be seen in FIG. 2_a_. The user's desktop 30 includes an icon 32 for the Google search application in the user's task bar. When the user hovers over or clicks on the desktop icon, a pop up dialog box 34 appears above the Google search application's icon in the manner illustrated in FIG. 2_b_. A search query 36 can be entered into the dialog box. The search query 36 shown in FIG. 2_c_ is "weather in san diego". In the illustrated embodiment, the Google search application provides the query to one of the Google search engine servers via an API, which returns the URL of a page containing the search results. The Google search application can then launch a web browser application and provide the URL to the browser application. The display of a page of search results in a web browser launched by the Google search application in accordance with an embodiment of the invention is illustrated in FIG. 2_d_. The browser application displays the page of results 38, which includes the search query 36 provided to the Google search application. Once the browser is launched, a browser icon 40 is also shown in the task bar.

As can be appreciated, the application illustrated in FIGS. 2_a_-2_d_ enhances the user's web experience. The task bar icon prevents the need to launch a browser application, and enter the search term in the browser. By enabling the provision of a search query directly at the launch point of the cross-platform application, the cross-platform application aids with task completion. In addition, the application presents the results in a browser enabling the user to simply navigate to pages of interest.

In addition to providing launch points, the Application Platform can also enable the cross-platform applications to provide notifications within a user's computing environment. The nature of these notifications is only limited by the notification technologies supported by the operating system underlying the Application Platform. Examples include but are not limited to placing badges over icons via the operating system and providing pop up notifications using the Application Platform. Several examples are illustrated in FIG. 2_e_ with respect to a Gmail cross-platform application that enhances a user's experience of the Gmail service provided by Google, Inc. A Gmail cross-platform application icon 42 is shown in the task bar on top of which a badge 44 is placed indicating three new emails. The icon is placed on the task bar via the integration layer and as the application determines that new emails are received within a user's email account by communicating with the Gmail servers, badges are placed over the icon via the integration layer. A temporary pop up notification 46 is also shown. Temporary pop-up notifications can be displayed using pop up notification capabilities provided within the operating system or using the capabilities of the Application Platform application. Pop up notifications are discussed further below.

Although specific cross-platform applications are illustrated in FIGS. 2_a_-2_e_, any of a variety of applications can be implemented as cross-platform applications that integrate with a user's computing environment in any of a number of different ways (not limited to the task bar) and that execute within the application runtime environment created by the Application Platform in accordance with embodiments of the invention. A variety of other cross-platform applications are discussed below with reference to the implementation of Application Platform applications and cross-platform applications in accordance with embodiments of the invention.

4. Application Platforms that Support Web Technologies

Figure 3:
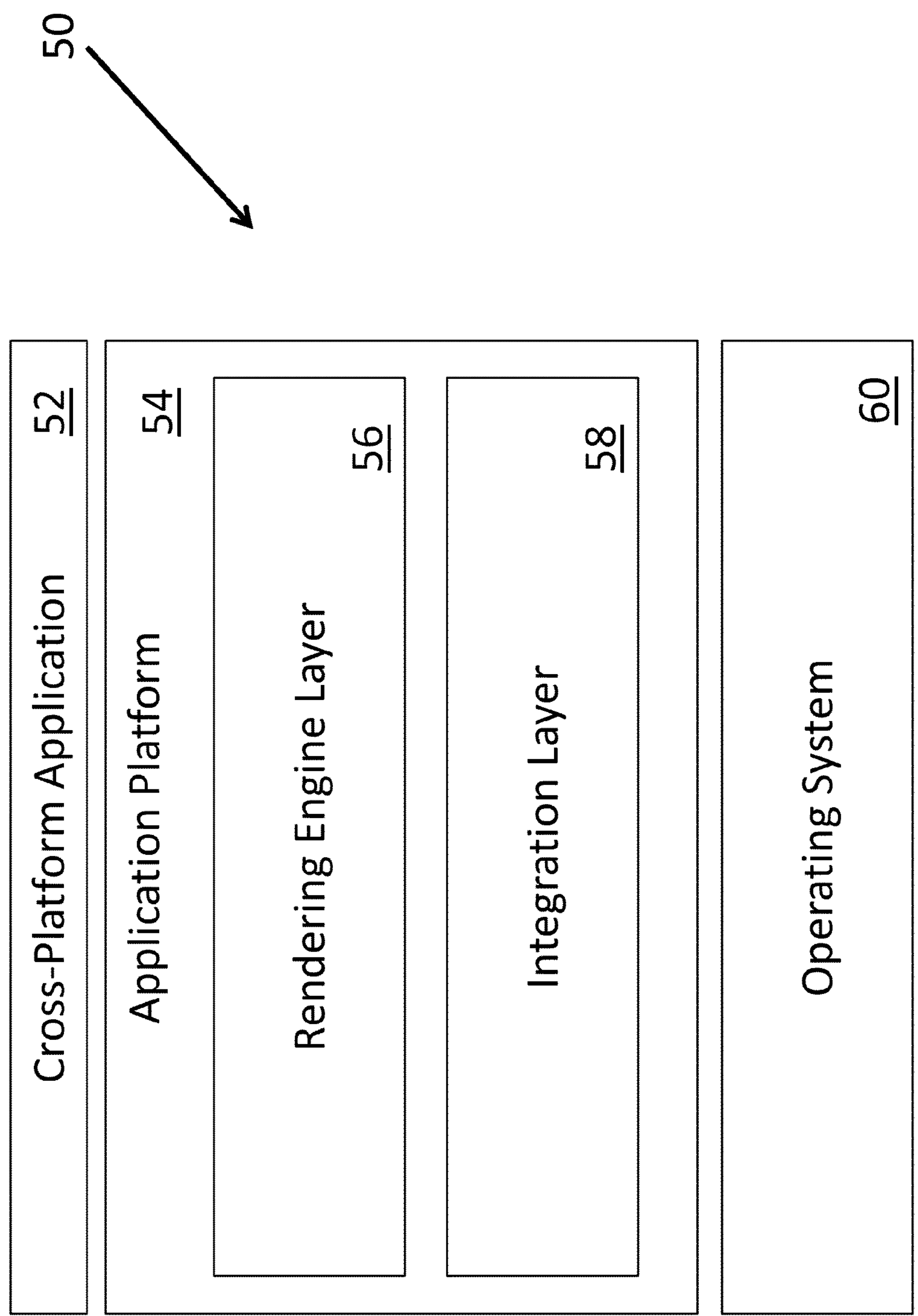
FIG. 3 conceptually illustrates a software stack including an Application Framework upon which cross-platform applications created using web technologies (i.e. the technologies that are typically used to implement web applications) can execute in accordance with an embodiment of the invention.

The manner in which an Application Platform application is implemented is largely dependent upon the application runtime environment that is created by the Application Platform and the cross-platform application that executes within the runtime environment. In many embodiments, Application Platform applications are implemented to create an application runtime environment that enables cross-platform applications to be developed using the same technologies utilized by web applications. The software stack of a cross-platform application implemented using web technologies and executing on an Application Platform application implemented in accordance with an embodiment of the invention is illustrated in FIG. 3. The software stack 50 includes a cross-platform application 52 that is created using the same technologies that can be used to implement web applications including (but not limited to) HTML, JavaScript, and/or CSSs. The cross-platform application is executed by an Application Platform application 54, which includes a rendering engine layer 56 and an integration layer 58. While the application executing on the Application Platform is a cross-platform application, at least a portion of the Application Platform 54 is natively implemented so that it can integrate with the computing environment generated by the device's operating system 60, enabling the cross-platform application to communicate with operating system processes and/or other natively implemented processes.

In a number of embodiments, the rendering engine layer 56 includes various parsers and virtual machines associated with supporting specific web technologies including but not limited to HTML, JavaScript, and CSS. The rendering engine layer 56 of the Application Platform 54 interprets the cross-platform application 52 in a manner similar to the manner in which the rendering engine of a web browser enables the execution of a web application. Indeed, many embodiments of the invention utilize a modified version of a rendering engine developed for use in a web browser. For example, a modified version of the WebKit or WebKit2 rendering engines can be used to implement a rendering engine layer in accordance with an embodiment of the invention.

In many embodiments, the integration layer 58 serves to enable an application developed using web technologies to behave within the computing environment as if it is a conventional desktop application. The integration layer 58 exposes a number of APIs that can be called by a cross-platform application to make modifications to a user's computing environment. In several embodiments, the integration layer APIs are JavaScript APIs that can be called by the various cross-platform applications running within the application runtime environment created by the Application Platform. In response to the API calls the integration layer can communicate with the operating system and/or natively implemented processes to modify the user's computing environment.

Any of a variety of applications can be implemented using web technologies for execution via an Application Platform application in accordance with an embodiment of the invention. A number of different applications and the manner in which the applications can be integrated into the user's computing environment are discussed below.

4.1. Implementing Cross-Platform Applications Using Web Technologies

When a cross-platform application is implemented using the same technologies that are utilized to implement web applications, the cross-platform application can be implemented using a "background page" that contains all of the logic of the application. As with a "conventional" web page, the "background page" is a text file (as opposed to a binary executable) that can include HTML, JavaScript and/or CSSs that the rendering engine layer of the Application Platform application parses to implement the logic contained therein in a similar fashion to the way in which the rendering engine of a web browser application parses a "conventional" web page when enabling a web application on a user device.

Figure 4:
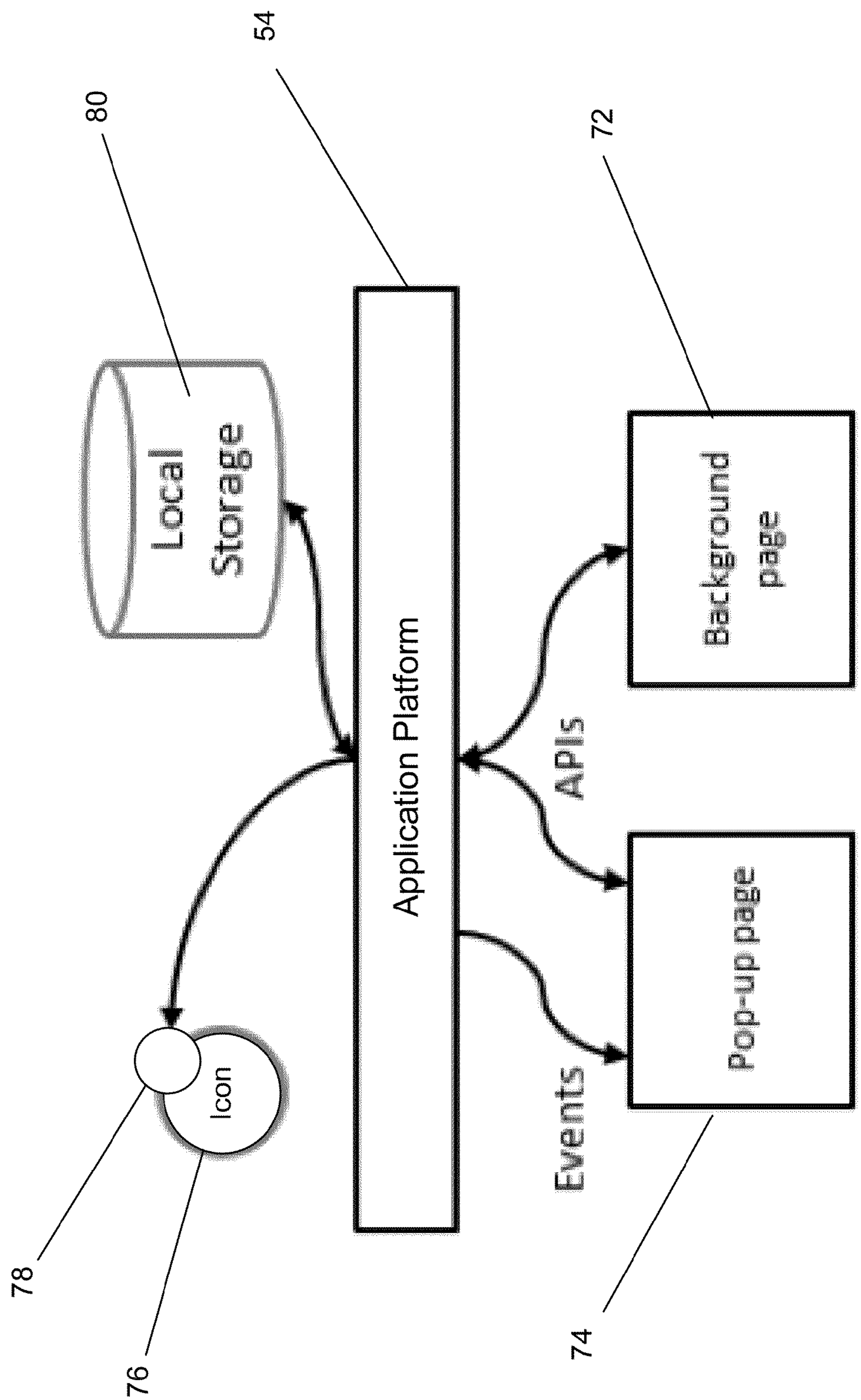
FIG. 4 conceptually illustrates the execution of a cross-platform application within an application runtime environment created by an Application Platform application in accordance with an embodiment of the invention.

In addition to a "background page", the cross-platform application can also include one or more "pop up pages" which are similar to a "conventional" web page and can be displayed to the user to implement notifications and/or a user interface. The manner in which applications in accordance with embodiments of the invention utilize "background pages" that are not visible to the user and "pop up pages" that are visible to the user is illustrated in FIG. 4. In the illustrated embodiment, the cross-platform application includes a "background page" 72 and at least one "pop up page" 74 that are stored on the computing device. Although only one "pop up page" is shown in FIG. 4, cross-platform applications in accordance with embodiments of the invention can include multiple "pop up pages". The Application Platform 54 process implements the logic contained within the "background page" 72 and can provide a user interface and/or notifications via various "pop up pages" 74. APIs exposed by the Application Platform 54 process enable logic within either the "background page" 72 or the "pop up page" 74 to modify and respond to interactions with launch points such as (but not limited to) icons 76 within the user's computing environment. For example, the APIs can enable any of the pages associated with the cross-platform application to provide a notification by placing a badge 78 on the application's icon within the computing environment or to respond to a user hovering over or clicking on the application's icon.

While each of the pages associated with a cross-platform application are processed by the Application Platform independently and do not necessarily share Document Object Model (DOM) or JavaScript contexts, the pages can communicate with each other using a Remote Procedure Call (RPC) method included in the Application Platform APIs, and share data using unified local storage 80. This allows for a reduction in duplicate data transferring and processing, and may be used to enhance application performance by caching data. In other embodiments, as is discussed further below, information can be exchanged via a remote server.

In embodiments where the Application Platform is implemented using a rendering engine layer and an integration layer, notifications can be provided via both layers. The rendering engine layer supports the display of pop up notifications, which can be "pop up pages" created using web technologies that are displayed to the user (in contrast with the invisible "background pages" containing the logic of the application). The APIs revealed by the integration layer of the Application Platform can also enable the provision of notifications through the user's computing environment.

Any of a variety of cross-platform applications can be implemented using web technologies for execution via an Application Platform in accordance with embodiments of the invention. A number of different applications and the manner in which the applications can be integrated into the user's computing environment are discussed below.

4.2. Integration of Cross-Platform Applications into Computing Environments

The integration layer of an Application Platform application can expose a number of APIs that can be called by a cross-platform application implemented using the same technologies as web applications to make modifications to a user's computing environment. In the context of a personal computer, a user's computing environment is typically a desktop. Several examples are provided below of the integration of cross-platform applications with desktop computing environments. Systems and methods in accordance with embodiments of the invention can, however, be used to create applications using web technologies that integrate with any of a number of different computing environments associated with specific device categories and operating systems.

A desktop computing environment typically includes desktop shortcuts, favorites, taskbar icons, and/or a start menu that facilitate functions including but not limited to the launching of desktop applications and the provision of notifications by desktop applications. In many embodiments, the integration layer serves to enable a cross-platform application to behave within the computing environment as if it is a conventional desktop application. For example, an integration layer can enable the creation of desktop shortcuts to launch applications created using web technologies and can provide shell support for the application enabling the application or a web application associated with the application to be associated with specific file types. An integration layer can also enable icons for applications created using web technologies to be included in the task bar and/or the start menu. An integration layer can also enable a cross-platform application created using web technologies to provide notifications within the computing environment. In several embodiments, the integration layer APIs are JavaScript APIs that can be called by the various applications running within the runtime environment created by the Application Platform. In response to the API calls the integration layer can communicate with the operating system to implement the modifications to the user's computing environment requested by the application.

Figure 5:
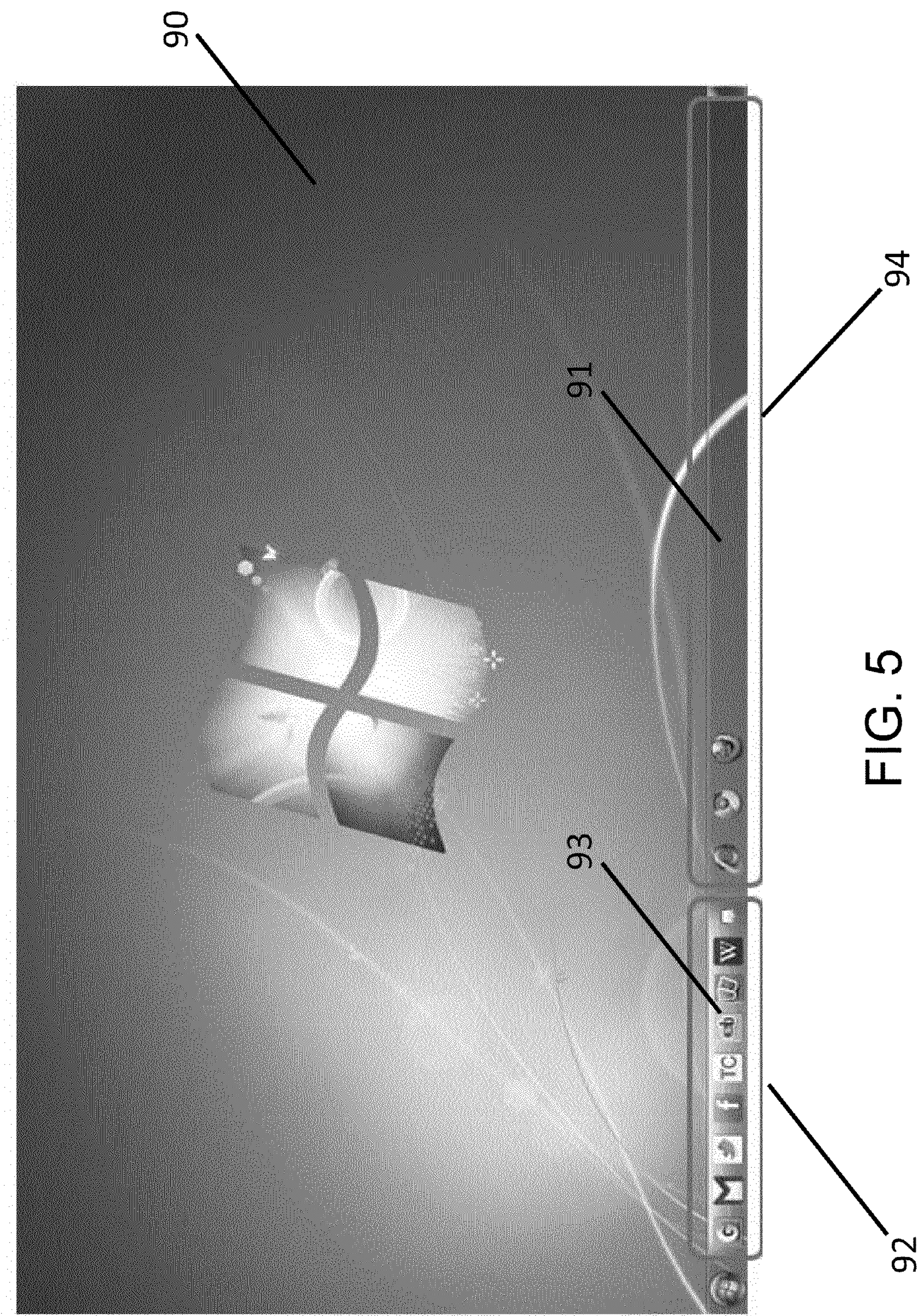
FIG. 5 conceptually illustrates the integration of icon launch points for cross-platform applications into the taskbar of a desktop computing environment by an Application Platform application in accordance with embodiments of the invention.

Integration of cross-platform applications within the taskbar of a desktop computing environment created by the Windows 7 operating system distributed by Microsoft Corporation of Redmond, Wash. is illustrated in FIG. 5. In the illustrated embodiments, the desktop computing environment 90 includes a taskbar 91. A first region of the taskbar 92 is reserved by the Application Platform process for icons 93 of cross-platform applications installed on the computing devices. The icons appear to the user to be the same as icons for conventional desktop applications. In the illustrated embodiment, however, the icons for the conventional desktop applications are located within a second region 94 of the taskbar.

Figure 6A:
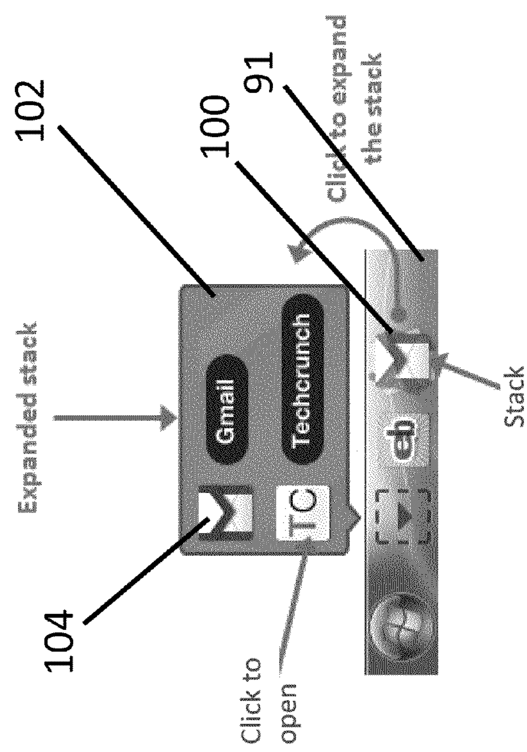
FIGS. 6*a* and 6*b* conceptually illustrate the integration and management of icon launch points into a toolbar of a desktop computing environment and the provision of notifications using badges in accordance with embodiments of the invention.

Users can access and manage cross-platform applications in the same way in which they can access desktop applications (i.e. by clicking on the icon or other launch point). In a number of embodiments, the Application Platform can provide techniques for the organization of icons associated with various cross-platform applications. A desktop computing environment in which icon launch points for cross-platform applications within the taskbar are arranged as stacks in accordance with an embodiment of the invention is illustrated in FIG. 6*a*. In the illustrated embodiment, the Application Platform integrates icon launch points into the taskbar 91 of a desktop computing environment. The taskbar 91 of the desktop computing environment includes stacks 100 of icon launch points for cross-platform applications. A user can select a stack 100, which expands the stack using a pop up 102 and the user can launch one of the cross-platform applications by selecting an icon 104 from within the pop up window. The term launch is used with respect to cross-platform applications to reference bringing the application to the foreground. As noted above, cross-platform applications in accordance with embodiments of the invention are typically executing so long as the Application Platform application is executing.

Figure 6B:
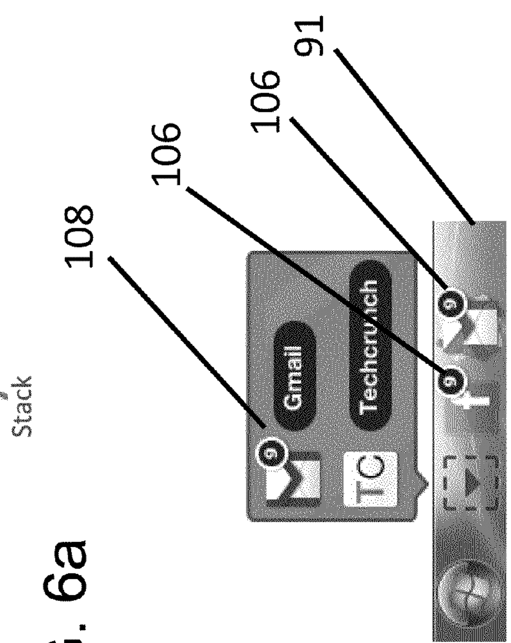

As noted above, an Application Platform also enables cross-platform applications to provide notifications via the user's computing environment. In the context of a desktop computing environment, the integration layer of an Application Platform configured to create a runtime environment for applications written using the same technologies as web applications can provide notifications by applying badges to icons used as launch points for the cross-platform applications. Application of badges to icon launch points in the toolbar of a desktop computing environment in accordance with an embodiment of the invention is illustrated in FIG. 6*b*. In the illustrated embodiment, icons and stacks of icons are shown in the toolbar 91 of a desktop computing environment. Badges 106 are applied to the icons or stacks of icons in the toolbar to provide notifications to the user. Badges 108 are also applied to the icons in the pop up showing an expanded stack of icons. The badges 106 and 108 are implemented through different mechanisms. The badges 106 overlaid on icons in the taskbar are implemented by the Application Platform communicating with the operating system of the communication device using an API within the integration layer that can be called by the cross-platform application. The badges 108 that appear in a pop up (e.g. an expanded stack of icons or another pop up) are implemented by the rendering engine layer of the Application Platform. The use of "pop up pages" to provide notifications and user interfaces is discussed further below.

4.3. Pop Up Notifications and User Interfaces

Once a cross-platform application implemented using the same technologies used to implement web applications in the manner outlined above is launched, the cross-platform application can utilize "pop up pages" to provide a user interface or pop up notifications. The rendering engine layer of an Application Platform can be utilized to render the "pop up pages" in accordance with the logic contained within the "background page" of the cross-platform application. In several embodiments, rendering the "pop up page" involves retrieving data from a remote server to populate the notification or user interface. In a number of embodiments, the "pop up page" is simply a URL that enables retrieval of a page from a remote server that can be rendered by the rendering engine to create the pop up notification and/or a user interface.

Figure 7:
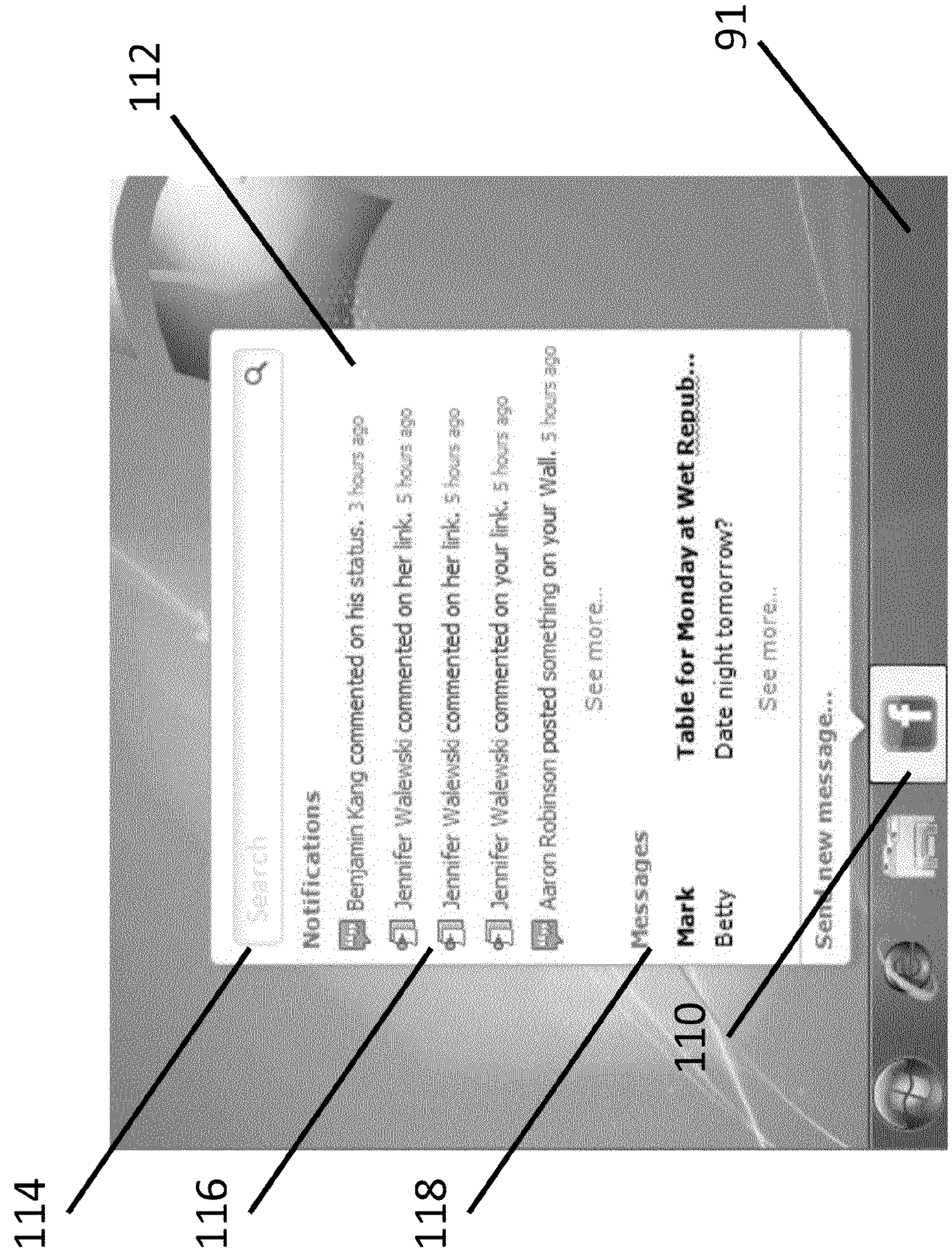
FIG. 7 conceptually illustrates a "pop up page" user interface generated by a social media cross-platform application implemented in accordance with an embodiment of the invention.

A notification provided by a social media application implemented in accordance with an embodiment of the invention is illustrated in FIG. 7. In the illustrated embodiment, a Facebook cross-platform application is executed by an Application Platform application to enhance a user's experience of the Facebook service provided by Facebook, Inc. of Palo Alto, Calif. The application is integrated into the taskbar 91 of a desktop computing environment, where a Facebook cross-platform application launch point icon 110 is displayed. A "pop up page" notification 112 is shown above the icon. In many embodiments, the circumstances under which of the pop up notification appears is determined by the logic of the cross-platform application. In several embodiments, the pop up notification appears in response to the user selecting the icon of the cross-platform application. In a number of embodiments, the pop up notification can appear periodically and/or in response to changes to a user account, web site, and/or web service hosted on a remote server (i.e. the Application Platform application retrieves information from a remote server that indicates a change in a user account such as (but not limited to) receipt of a message, friend request, being tagged in a photo, a comment, or any other activity, event and/or notification associated with a user account and/or with a specific web site or service).

In the illustrated embodiment, the notification is defined in such a way that the notification provides a search function 114, and is populated with data retrieved from Facebook's servers via appropriate APIs. In the illustrated embodiment, the retrieved information included in the notification is a number of Facebook "notifications" 116 and a number of Facebook "messages" 118. As noted above, the pop up notification can be constructed using the same technologies that are used to author web pages and/or web applications. Although a specific notification is illustrated in FIG. 7, any of a variety of notifications can be presented via a rendering engine layer in an Application Platform in accordance with embodiments of the invention including but not limited to notifications involving content retrieved from remote servers via the Internet, and/or notifications that are themselves retrieved by the application from remote servers via the Internet using techniques including but not limited to the application providing a URL that the remote servers use to identify a notification to return to the application. When implemented using web technologies, the capabilities of the "pop up pages" to provide user interfaces and notification pop ups are only limited by the capabilities of the rendering engine layer of the Application Platform application. In other embodiments, any of a variety of cross-platform technologies can be utilized to implement "pop up pages" appropriate to the requirements of an application in accordance with embodiments of the invention.

5. WebSheets and Website/Web Application Sign In

Cross-platform applications in accordance with many embodiments of the invention can automatically sign a user in to specific websites or web applications. The user can provide login and password information and that information can be securely stored within local storage accessible to the cross-platform application to enable the application to login to a site via an API and/or launch a website without the need for the user to provide login and password information. When the cross-platform application is implemented using the same technologies used to implement web applications, the "pop up page(s)" typically reference a single URL. In many instances, completion of a sign on process on a web application can involve accessing pages at multiple dynamically generated URLs. Therefore, Application Platforms in accordance with many embodiments of the invention include the ability of a cross-platform application to embed a chromeless web browser into a "pop up page". Such a chromeless browser pointing to a specific URL can be referred to as a WebSheet. WebSheets can automatically render URLs (including dynamically generated URLs) returned by a remote server in response to information provided by the user via a user interface displayed within the WebSheet. In several embodiments, the WebSheets can specify a callback function every time an external URL changes. From the callback, the chromeless browser can render the URL being loaded. WebSheets are extremely useful in the development of cross platform applications and are particularly useful with providing sign in information to remote web services.

Figure 8A:
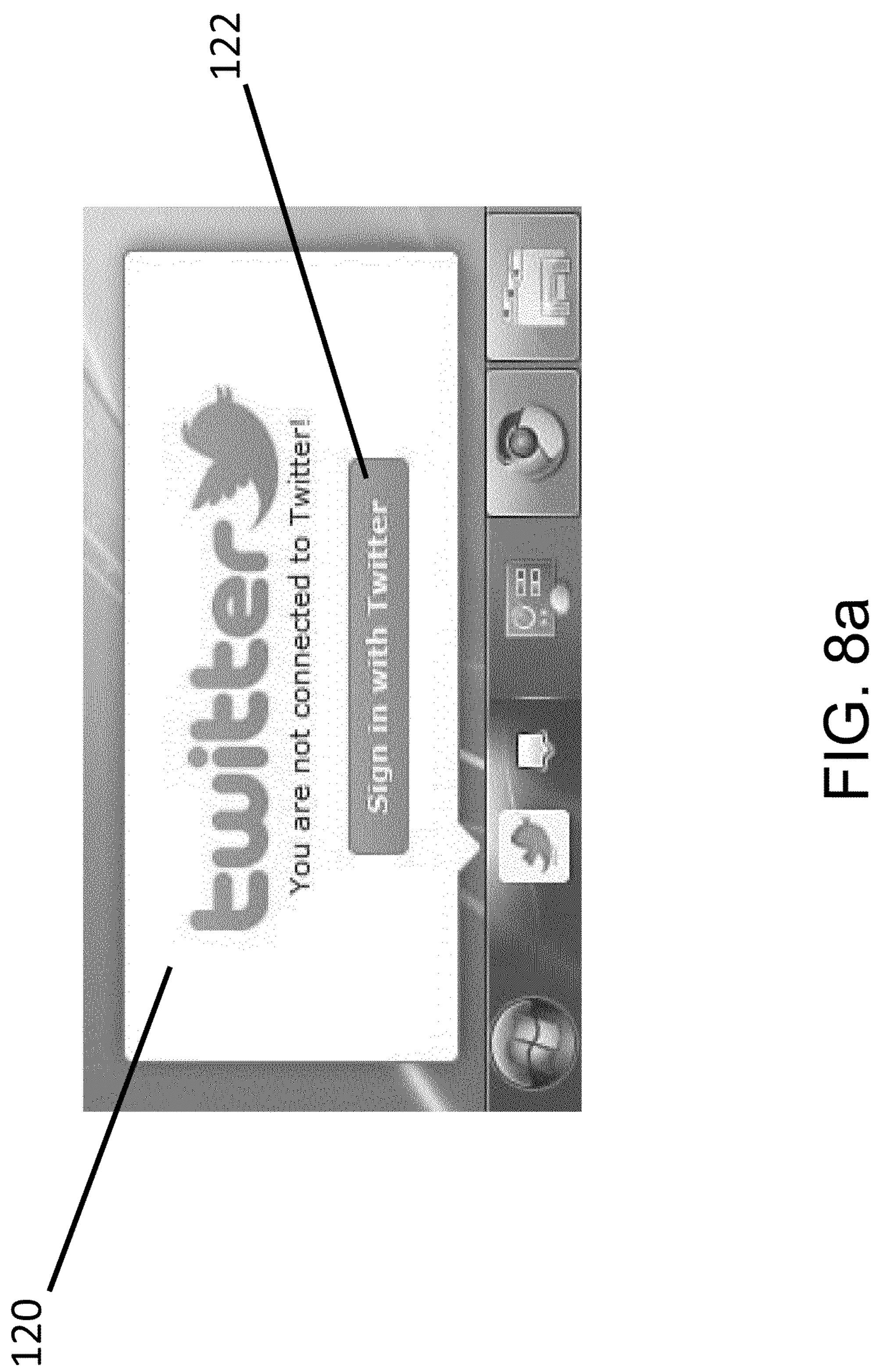
FIGS. 8*a* and 8*b* conceptually illustrate the provision of login information to a web service using WebSheets (i.e. a chromeless web browser) to enable a cross-platform application to automatically log a user into the web service in accordance with an embodiment of the invention.
Figure 8B:
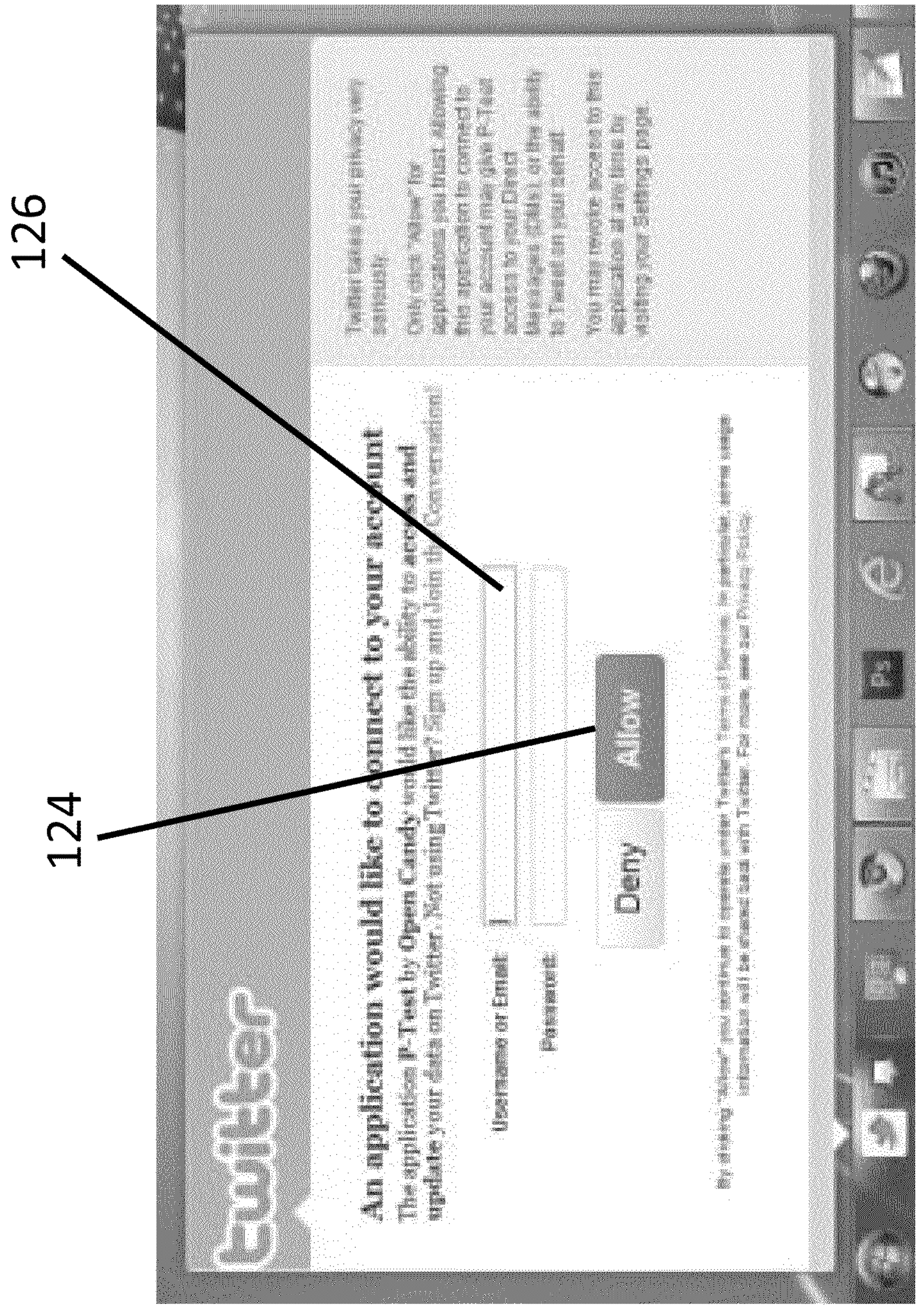

A pop up dialog box generated by a cross-platform application executing on an Application Platform that supports WebSheets in accordance with an embodiment of the invention is illustrated in FIGS. 8*a* and 8*b*. The pop up dialog box 120, which is rendered by the Application Platform using a local "pop up page" included in the cross-platform application, invites the user to request permission for the cross-platform application to use the Twitter API provided by the Twitter, Inc. of San Francisco, Calif. on behalf of the user. When the user selects the button 122, the pop up window expands to contain a WebSheet (i.e. a chromeless web browser contained within the "pop up page") that loads a URL that causes a Twitter login web page 126 (i.e. a page retrieved from a remote server that can be rendered using the chromeless browser) to be displayed within the pop up window. The user can provide login information via a user interface contained within the login web page 126. The cross-platform application monitors the URL changes in the WebSheet, handling errors and extracting a Twitter access token once permission is granted to the user. The Twitter token can be saved locally and used by the Twitter cross-platform application to access information associated with the user's account maintained on the Twitter servers via an API. Once obtained, login credentials such as a token can be secured in any of a variety of different ways. For example, credentials can be secured by the integration layer using operating system provided security functions. In many embodiments, login credentials are secured on devices running the Windows 7 operating system distributed by Microsoft Corporation of Redmond, Wash. using the Windows Data Protection APIs.

Although a specific use of WebSheets related to web service logins is illustrated in FIGS. 8*a* and 8*b*, any of a variety of techniques can be utilized by cross-platform applications in accordance with embodiments of the invention log into remote servers and/or web services. In addition, WebSheets can be utilized for a variety of functions in accordance with embodiments of the invention and are not limited to simply managing log in processes for remote web services.

6. Browser Selection

Many users have multiple web browsing applications installed on their computing devices. In a number of embodiments, the Application Platform utilizes a set of rules to determine the manner in which to launch a specific website or web application within a browser application. In a number of embodiments, the Application Platform opens a new window in the same browser that was being used when the application was downloaded and installed. If the application was not installed from a browser, then a new window is opened in any browser that is running and has focus. If no browser is running and has focus, then a window is opened in the default browser.

Although a specific set of rules is outlined above, any of a variety of rules can be used in the selection of a browser application in which to launch a new window and/or tab beyond simply opening a new window in the default browser using a cross-platform application executing on top of a Application Platform in accordance with an embodiment of the invention.

7. Cross-Platform Application Discovery

Figure 9:
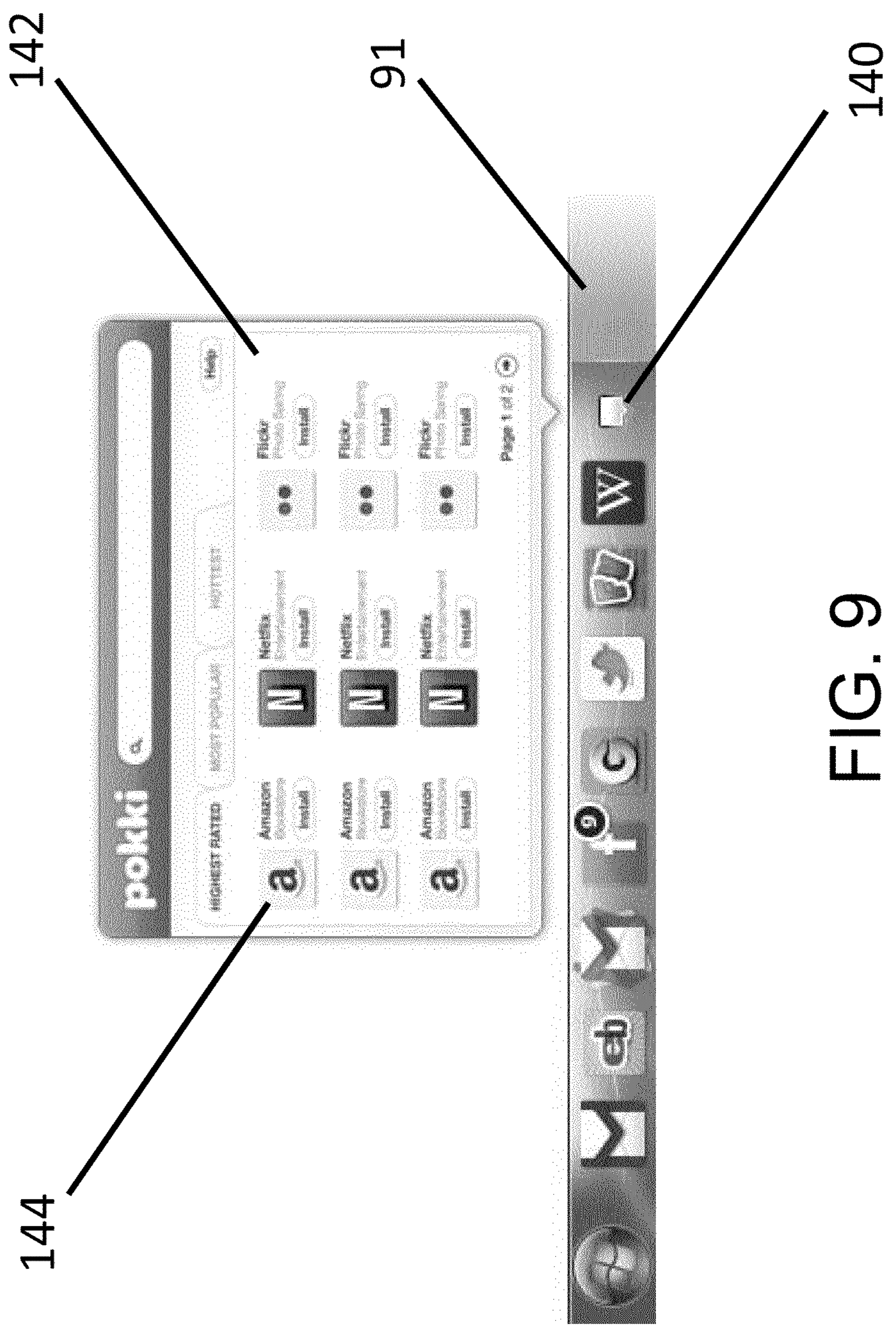
FIG. 9 conceptually illustrates a user interface generated by an Application Platform application to facilitate discovery of cross-platform applications in accordance with embodiments of the invention.

The rendering engine layer can also be used by the Application Platform application to provide a user interface. As noted above, the Application Platform application can utilize "pop up pages" rendered by its rendering engine to display user interfaces such as (but not limited to) the expanded stacks of launch point icons shown in FIGS. 6*a* and 6*b*. In many embodiments, the Application Platform can provide a user interface via "pop up pages" or a similar mechanism that facilitates the discovery of cross-platform applications. An example of a user interface generated by an Application Platform to facilitate the discovery of cross-platform applications in accordance with an embodiment of the invention is illustrated in FIG. 9. In the illustrated embodiment, a cross-platform application discovery icon 140 is integrated within the taskbar of the desktop computing environment and pop up user interface 142 is located above the icon 140. The pop up user interface 142 generated by the Application Platform displays a list of cross-platform applications 144 that can be launched via the user interface. In this context, launching the cross-platform application can involve the installation of the cross-platform application. The installation of cross-platform applications is discussed further below. Although a specific user interface appears in FIG. 9, as can readily be appreciated any user interface can be created and presented by the Application Platform in accordance with an embodiment of the invention.

The cross-platform applications that are displayed by the Application Platform in accordance via the discovery pop up user interface can be manually selected or via a scoring mechanism or recommendation engine. In several embodiments, the cross-platform applications that are most popular during a predetermined time period and/or on a predetermined class of devices (e.g. PC or smartphone) are displayed via the pop up user interface. In other embodiments, the basis for selecting cross-platform applications for display via a discovery pop up user interface generated by an Application Platform in accordance with embodiments of the invention is determined based upon the requirements of a specific application.

Cross-platform applications in accordance with embodiments of the invention are typically linked to a website or web application. Therefore, a user's browsing habits can be utilized as the basis of making recommendations of cross-platform applications that could enhance the user's experience of frequently utilized websites or web applications. In many embodiments, a browser extension can be utilized to make recommendations, the recommendations are integrated into websites and/or web applications, and/or the Application Platform monitors browsing activity and provides recommendations. In several embodiments, recommendations are made based on a user's browsing history, desktop application usage history, and/or usage of cross-platform applications executing via the Application Platform. In many embodiments, the recommendations are not limited to cross-platform applications that can execute via the Application Platform, but can be any type of recommendation including a website, a web application, and/or desktop software.

8. Installation of Cross-Platform Applications

Figure 10A:
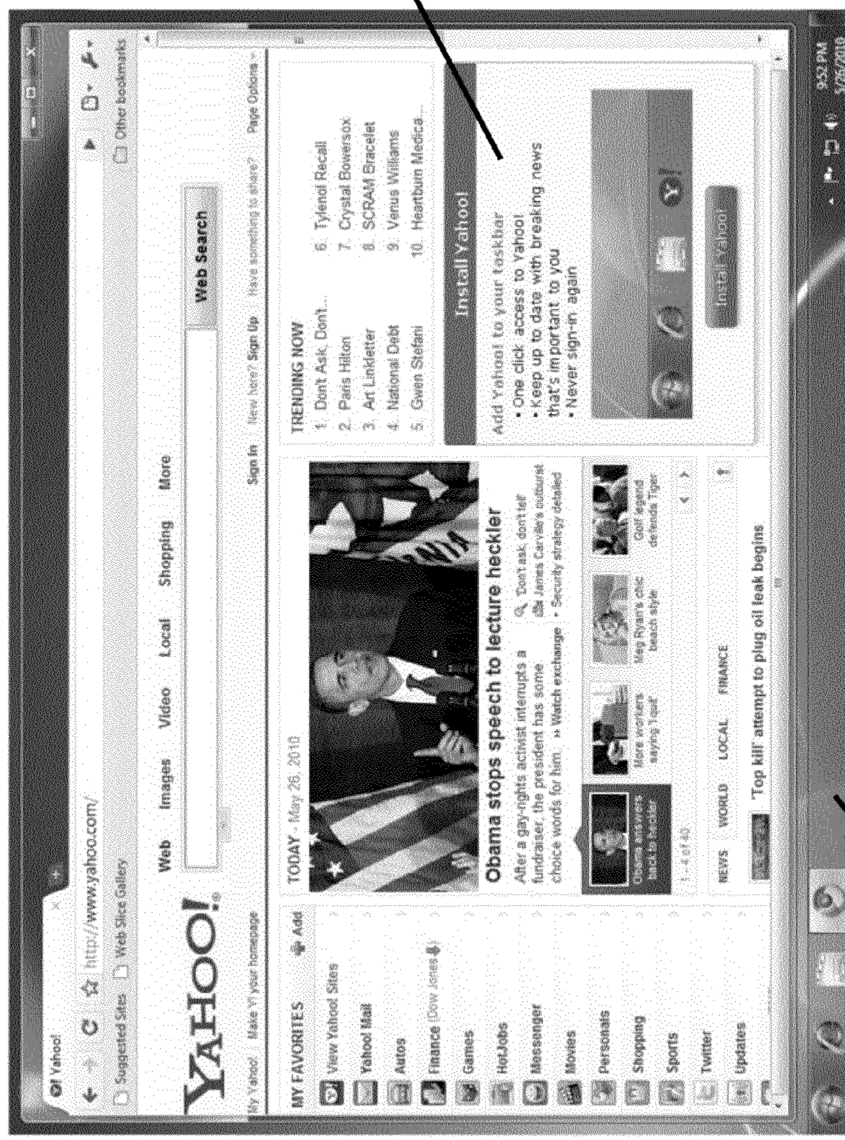
FIGS. 10*a* and 10*c* conceptually illustrate a process for installing an Application Framework and a cross-platform application in accordance with an embodiment of the invention.
Figure 10B:
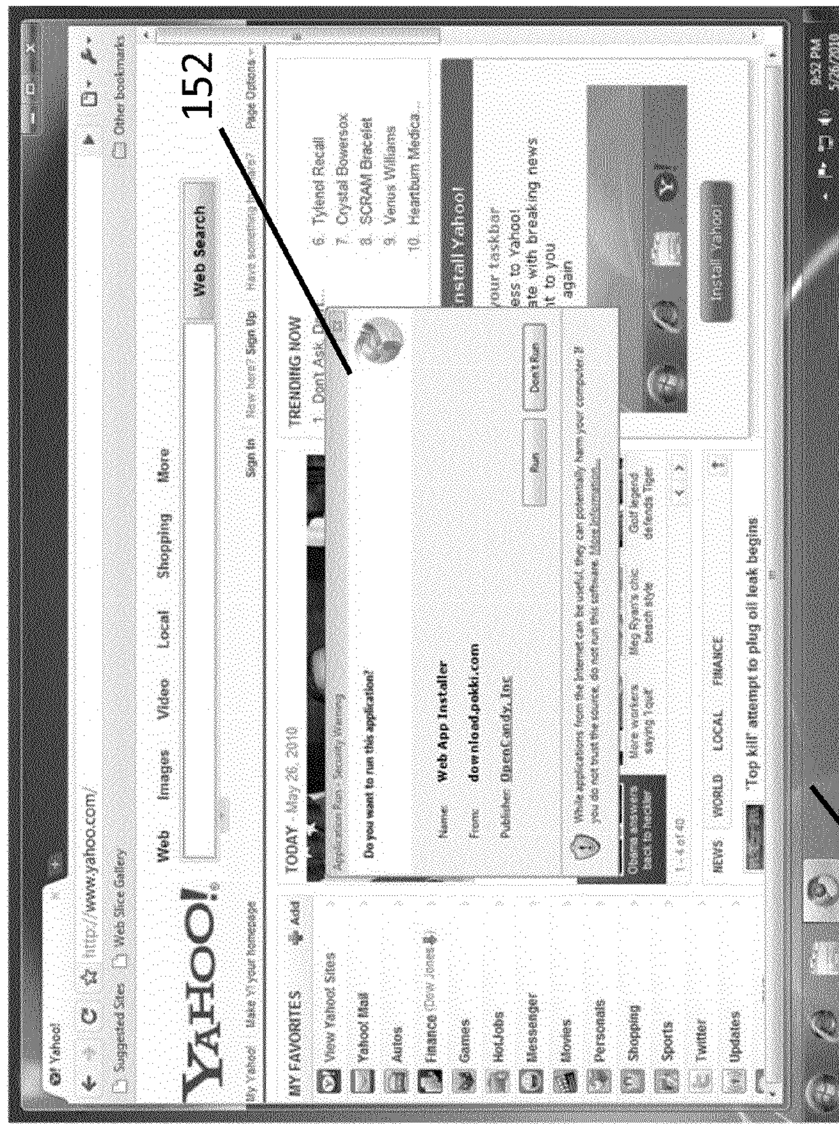
Figure 10C:
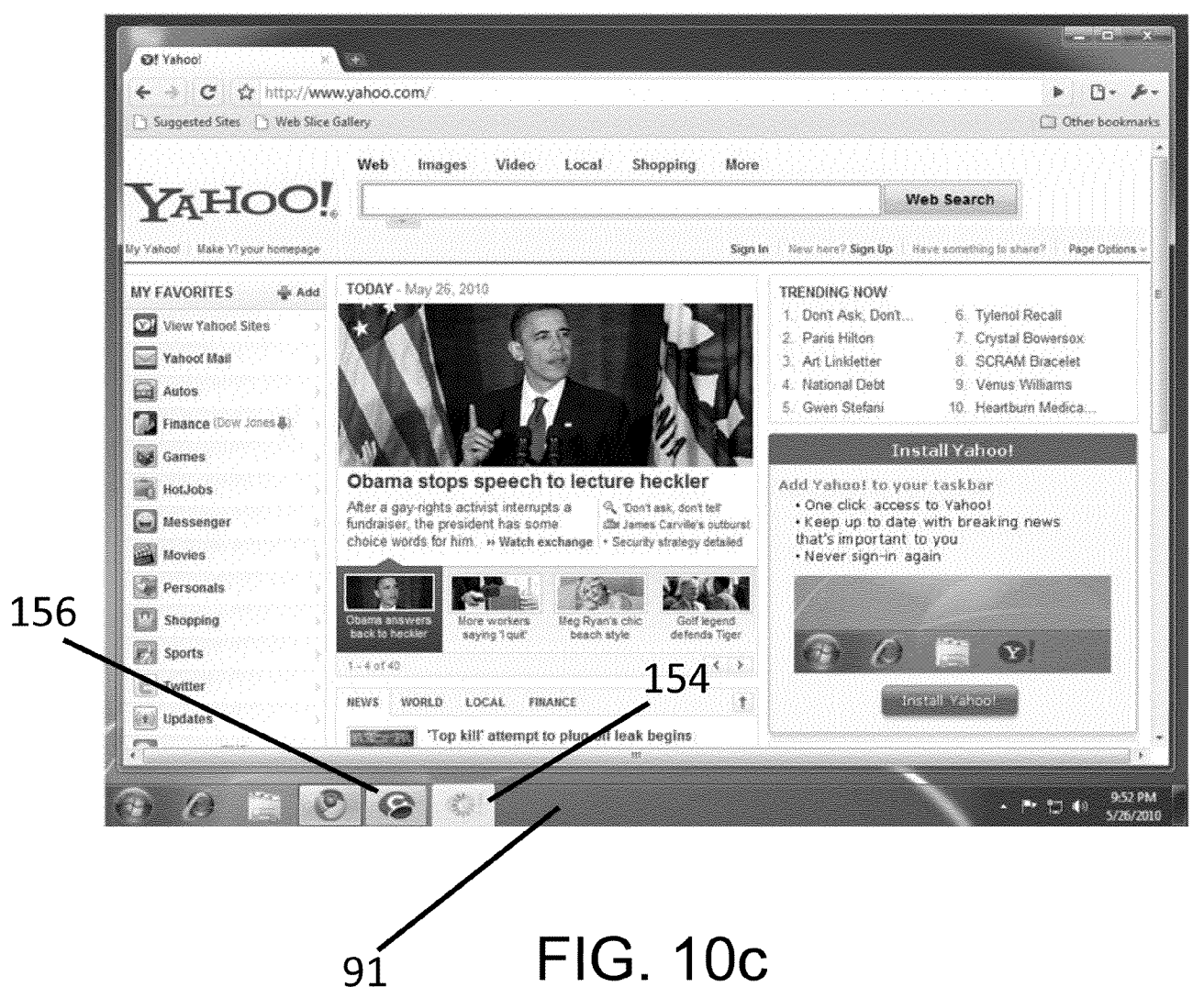

When a user first downloads a cross-platform application in accordance with an embodiment of the invention, the installer can also download and install the Application Platform that is used to generate the runtime environment in which the cross-platform application can execute. After the initial download of the Application Platform, future cross-platform application downloads can simply involve downloading and installation of the application. A process for downloading an application in accordance with an embodiment of the invention is illustrated in FIGS. 10*a*-10*c*. The process involves presenting a user interface 150 to the user via a website, or via the rendering engine of the Application Platform enabling the user to select to download a specific cross-platform application. When the user selects the download option, a dialog box 152 is displayed confirming that the user wishes to run an installer. When the user selects to run the installer, the installer confirms whether the Application Platform application is present on the user's device. During the running of the installer, recommendations for other applications that can be downloaded can also be made in the manner outlined in U.S. patent application Ser. No. 12/398,136 entitled "Advertising and Promotional System" the disclosure of which is incorporated by reference in its entirety. In other embodiments, a streamlined downloading process is used such as the downloading process disclosed in U.S. Provisional Patent No. 61/499,072 entitled "Systems and Methods for Streamlined Downloading of Content", filed Jun. 20, 2011, the disclosures of U.S. patent application Ser. No. 12/398,136 and U.S. Provisional Patent No. 61/499,072 are hereby incorporated by reference herein in their entirety.

In the illustrated embodiment, the Application Platform application is not present and the installer installs both the Application Platform and the cross-platform application. The cross-platform application icon 154 is not shown as being installed until the installation of both the Application Platform application and the cross-platform application is complete. In the illustrated embodiment, the presence of the Application Platform application is indicated by an icon 156 in the taskbar 91 of the desktop computing environment, which may itself be generated by a cross-platform application built on top of the underlying Application Platform application. During or upon completion of the download process, the Application Platform application can generate a pop up notification to encourage the user to utilize the downloaded application and/or discover additional applications.

Although the above discussion assumes that the Application Platform application is not resident on a user device, in many embodiments an Application Platform can be pre-installed upon a user device, downloaded separately from a cross-platform application intended to run on top of the Application Platform, or the Application Platform can be integrated within the operating system of the computing device (e.g. the rendering engine is integrated within the operating system).

8.1. File Formats

In many embodiments, the installation of cross-platform applications is facilitated by including all of the assets of the cross-platform application within a single file. In a number of embodiments, the file is digitally signed to enable identification of the cross-platform application and to verify that the cross-platform application was packaged by an appropriate authority (verification of cross-platform applications is discussed further below). The signing can be implemented using public/private key pair cryptography and signature hashes (sha1 hashing and RSA encryption/signing with 1024 bit private keys). In other embodiments, any of a variety of signing and or verification techniques can be utilized as appropriate to a specific application.

In several embodiments, a file containing a cross platform application includes a header and a compressed payload. The header can includes information that identifies the file format, its version and can contain the public key and signature for the package. The signature can be created using the private key associated with the cross-platform application's public key from a sha1 hash of the cross-platform application's file contents. The compressed payload can include a number of files containing the assets of the cross-platform application. When the cross-platform application is implemented using web technologies, then the compressed payload can include a file containing the "background page", at least one page containing a "pop up page", and any additional assets including but not limited to image files. In many embodiments, the cross-platform application file can be created using open source took including but not limited to the zlib and openssl libraries that provide cross platform results. In other embodiments, any of a variety of custom tools can be provided.

In a number of embodiments, the cross-platform application file also includes a compressed manifest file containing the public key of the cross-platform application to enable verification of the cross-platform application after installation. The verification of cross-platform applications in accordance with embodiments of the invention is discussed further below. During installation or updating of a cross-platform application, the Application Platform application can verify each cross-platform application using its signature and/or the public key in the header and the manifest file.

9. Verification Servers

Referring back to FIG. 1, in many embodiments the Application Platform application is configured to communicate with one or more verification servers to obtain updates and to verify the authenticity of any new cross-platform applications being installed. In a number of embodiments, the verification server is used by Application Platform applications installed on a variety of computing devices to query the status of the cross-platform applications installed on the computing device and to verify that the Application Platform itself is operating correctly (i.e. hasn't been tampered with or isn't due for a mandatory upgrade). In many embodiments, the verification server includes a database containing a listing of cross-platform applications activated by a user and/or with respect to specific user devices.

Figure 11:
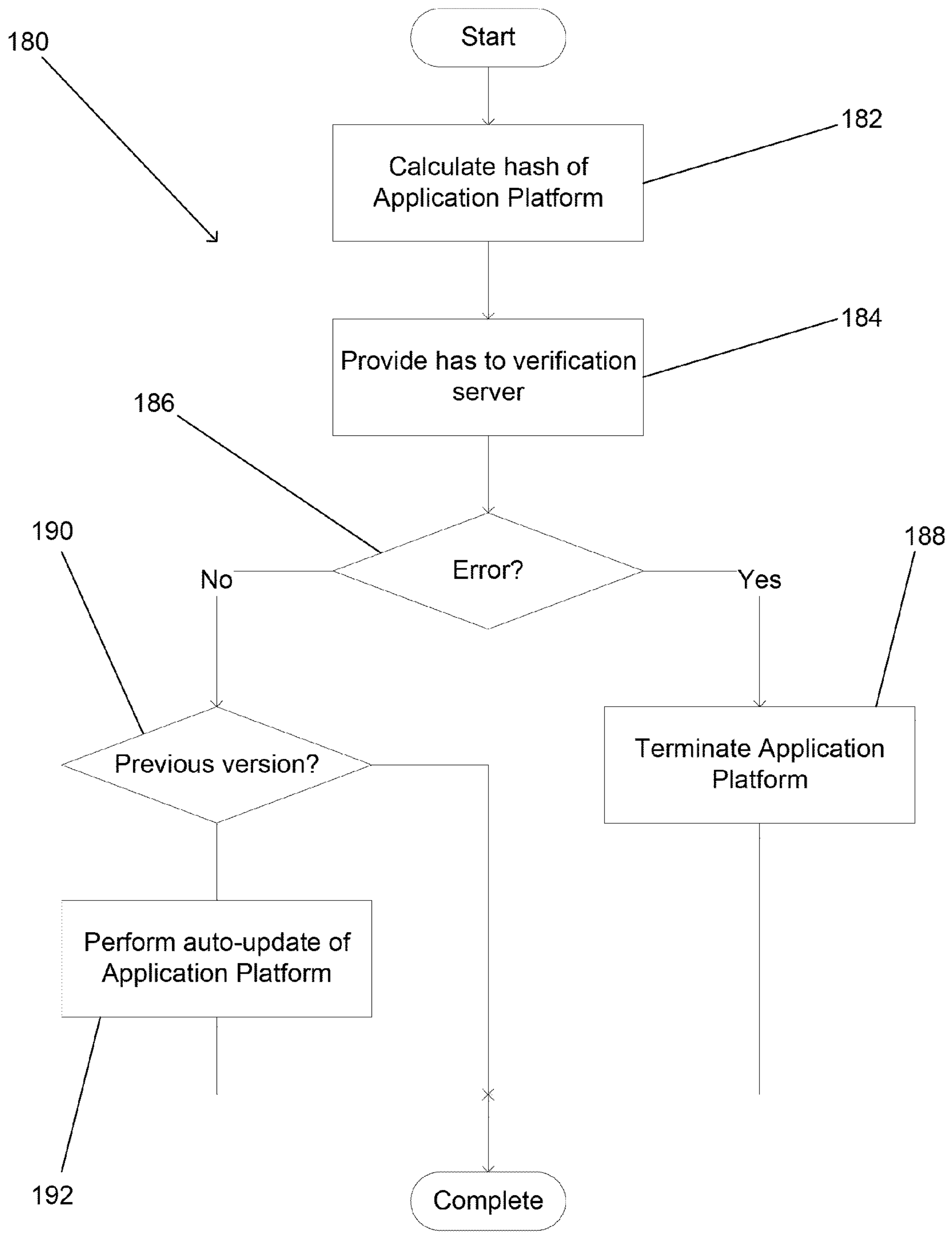
FIG. 11 is a flow chart illustrating process for verifying an Application Process application in accordance with an embodiment of the invention.

In many embodiments, the verification process involves verifying that the integrity of the Application Platform is intact and that the Application Platform is up to date. A process for verifying an Application Platform in accordance with an embodiment of the invention is illustrated in FIG. 11. The process 180 includes the Application Platform calculating (182) a hash of itself, which can be calculated from a variety of concatenated binary files that are not expected to change post installation in a fixed order. The calculated hash value is then provided (184) to the verification server. The verification server maintains a list of known hashes for previous and current releases of the Application Platform application on all computing platforms. If no match is found, then an error status is returned indicating that the Application Platform is corrupted and/or subject to tampering. Otherwise, the verification server determines whether an update of the Application Platform application is available for the specific computing device.

When the Application Platform determines (186) that an error status has been returned by the verification server, the Application Platform application is terminated and/or disabled (188). When the Application Platform determines (190) that an update is available, the Application Platform initiates the downloading and updating of the Application Platform application. When the Application Platform is verified and up to date, then the process completes.

When the Application Platform has been verified and is up to date, each individual cross-platform application installed on the computing device can be verified by the Application Process application using a process similar to the process illustrated in FIG. 11. In several embodiments, the information provided to the verification server by the Application Process application with respect to a specific cross-platform application includes a public key contained within the cross-platform application and a hash determined by the Application Platform application of one or more files associated with the cross-platform application. When a download is available, the verification server can return the location of the updated cross-platform application file or package to the Application Platform application and the Application Platform application can initiate a resilient and/or silent installation process to download and install the new version of the cross-platform application. In this way, the ability to automatically update cross-platform applications can be implemented natively in the Application Platform application and a developer of cross-platform applications can simply provide the details of a new version of the cross-platform application to a verification server and the Application Platform will automatically manage the updating of the cross-platform application without the need for the cross-platform application itself to possess the capability to manage its own updating.

Although specific processes that can be utilized by an Application Platform application to verify and update itself and cross-platform applications installed on a computing device are discussed above, any of a variety of processes appropriate to specific applications can be utilized by an Application Platform application to both verify and update the Application Platform application and/or cross-platform applications installed on a computing device in accordance with embodiments of the invention.

10. Local Content Sharing

In many embodiments, the Application Platform application provides persistent data storage. In a number of embodiments, data storage is supported using HTML5 standard local storage. The domain of the local storage is typically a cross-platform application, therefore, where the cross-platform application is implemented using web technologies the "background page" and the "pop up page(s)" of the cross-platform application can access the local storage and share local storage context. The local storage can be utilized by a cross-platform application to communicate between pages and to store the state of pages that are not displayed by the Application Platform process. In several embodiments, the Application Platform application prevents different cross-platform applications from accessing the same local storage. In a number of embodiments, the Application Platform application caches local versions of web pages and/or other assets retrieved from remote servers when executing cross-platform applications to enable the cross-platform applications to execute in the absence of a network connection. When a network connection is present, the Application Platform application can retrieve the webpage and/or asset(s) indicated by a specific URL. When the network connection is absent, the Application Platform application can retrieve the cached version of the webpage and/or asset(s) from local storage. In many embodiments, local caches are used to increase the execution speed of cross-platform applications and locally cached versions of webpages and/or assets are utilized even when a network connection is present and the Application Platform application periodically updates the cached versions of the webpage(s) and/or asset(s) associated with specific cross-platform applications.

11. Content Sharing Via Coordination Servers

Figure 12:
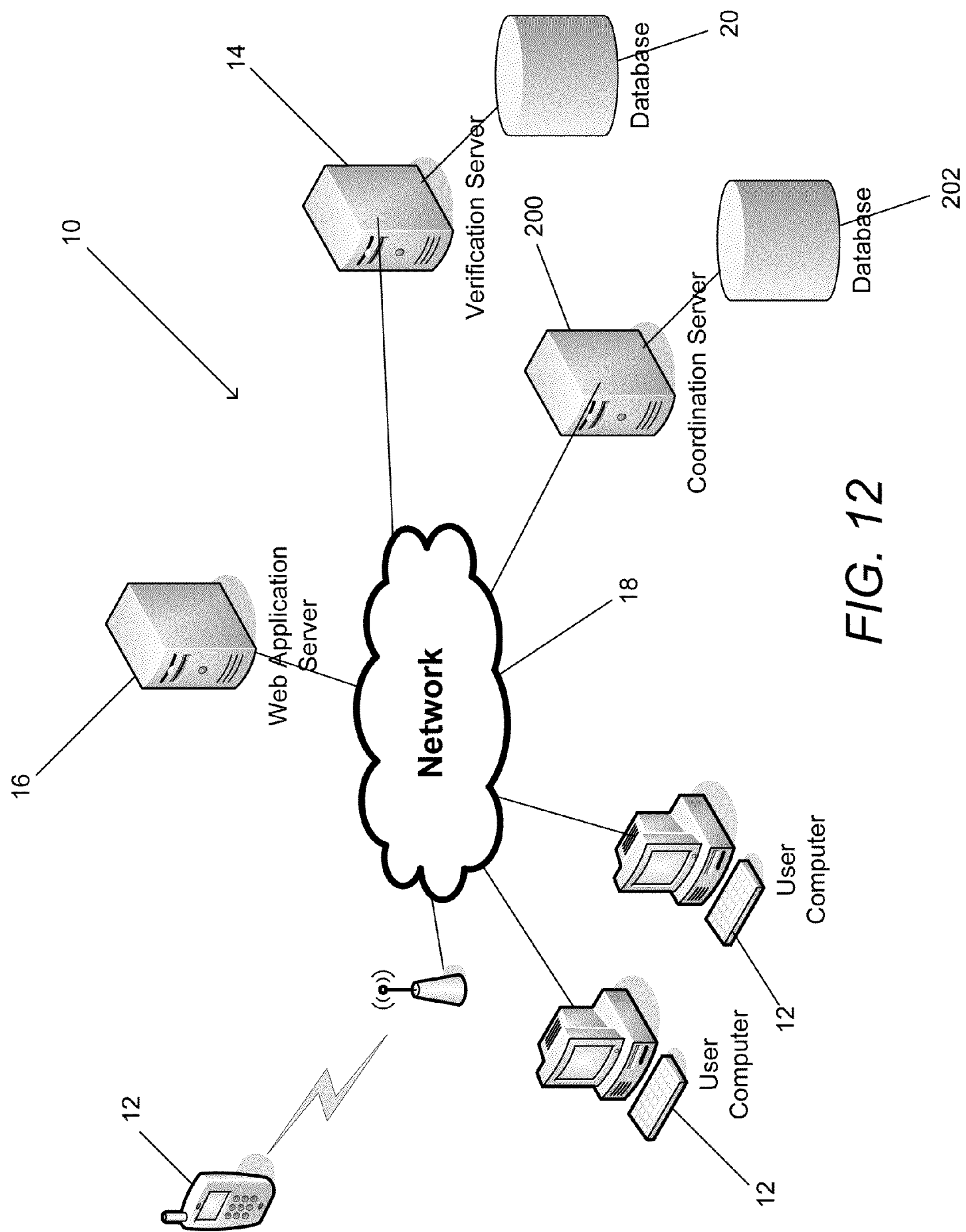
FIG. 12 is a network diagram illustrating computing devices on which Application Platforms are installed that enable cross-platform applications installed on the computing devices to communicate with web servers and verification servers via the Internet and in which a coordination server facilitates data exchanges between application executing within the device's computing environments and web applications in accordance with an embodiment of the invention.

In many instances, the transfer of data between desktop applications and web applications is problematic. When the data is formatted and cannot be transferred simply by a conventional cut and paste operations, significant coordination can be required. Referring to FIG. 12, Application Platform applications in accordance with embodiments of the invention can communicate with and can enable cross-platform applications to communicate with a coordination server 200 that facilitates information exchange between desktop applications including (but not limited to) Application Platform processes, cross-platform applications, and web applications. Although separate verification and coordination systems are shown in FIG. 12, a single server system can be implemented that performs as both verification and coordination servers.

Depending upon the nature of the integration between the coordination server and a specific web application, various communication interfaces can be used to exchange information between desktop applications, cross-platform applications, and web applications. In a number of embodiments, the coordination server supports at least one type of communication interface such as RSS feeds, direct Internet communication using raw data packets, communications via the HTTP protocol, and/or FTP file transfer. As is discussed further below, the data exchanged may be used for any of a variety of purposes, including but not limited to user data, application data, configuration data, and event notifications. The use of coordination servers to facilitate data exchange in accordance with embodiments of the invention is discussed further below.

11.1. Transfer of Data to Web Applications

Coordination servers in accordance with embodiments of the invention can facilitate data transfer between an application executing within a user's desktop computing environment such as a native desktop application or a cross-platform application (via the Application Platform application), and an integrated web application. The "cutting and pasting" of complex data between an application executing within a user's desktop computing environment and a web application is just one example of a data transfer. Typically, a web browser does a very poor job of passing data from the clipboard of a computing environment to a web application. In addition, a web application may not be able to interface with the data, because it does not understand the data. Coordination servers in accordance with embodiments of the invention can intercept native data in the browser or obtain the native data directly from the application executing within a user's desktop computing environment (e.g. via an Application Platform application) and can translate the native data into a format that is acceptable to the web application. An example of this would be the transfer of a spreadsheet segment from a desktop application, where the segment includes complex formulas, to a web application spreadsheet. While the web application may support importing an entire file, it typically cannot handle the "drag and drop" or "cut and paste" of this complex data. A coordination server can use one of a number of different methods to intercept the "cut" data and input this data to the web application either by simulating user input, translation to a "cut and paste" format the web application understands, or other methods which require no special support by the web application. In several embodiments, the web application can actually be integrated to include an API enabling a coordination server to pass the data directly to the web application. However, in many embodiments the goal of the coordination server is to simplify any work on the part of the web application to support integration and so the data transfer can be performed without the provision of a specialized API. As such, a web application can obtain a fully embedded appearance and operation within a user's computing environment without any additional development work being performed by the web application developer.

Figure 13:
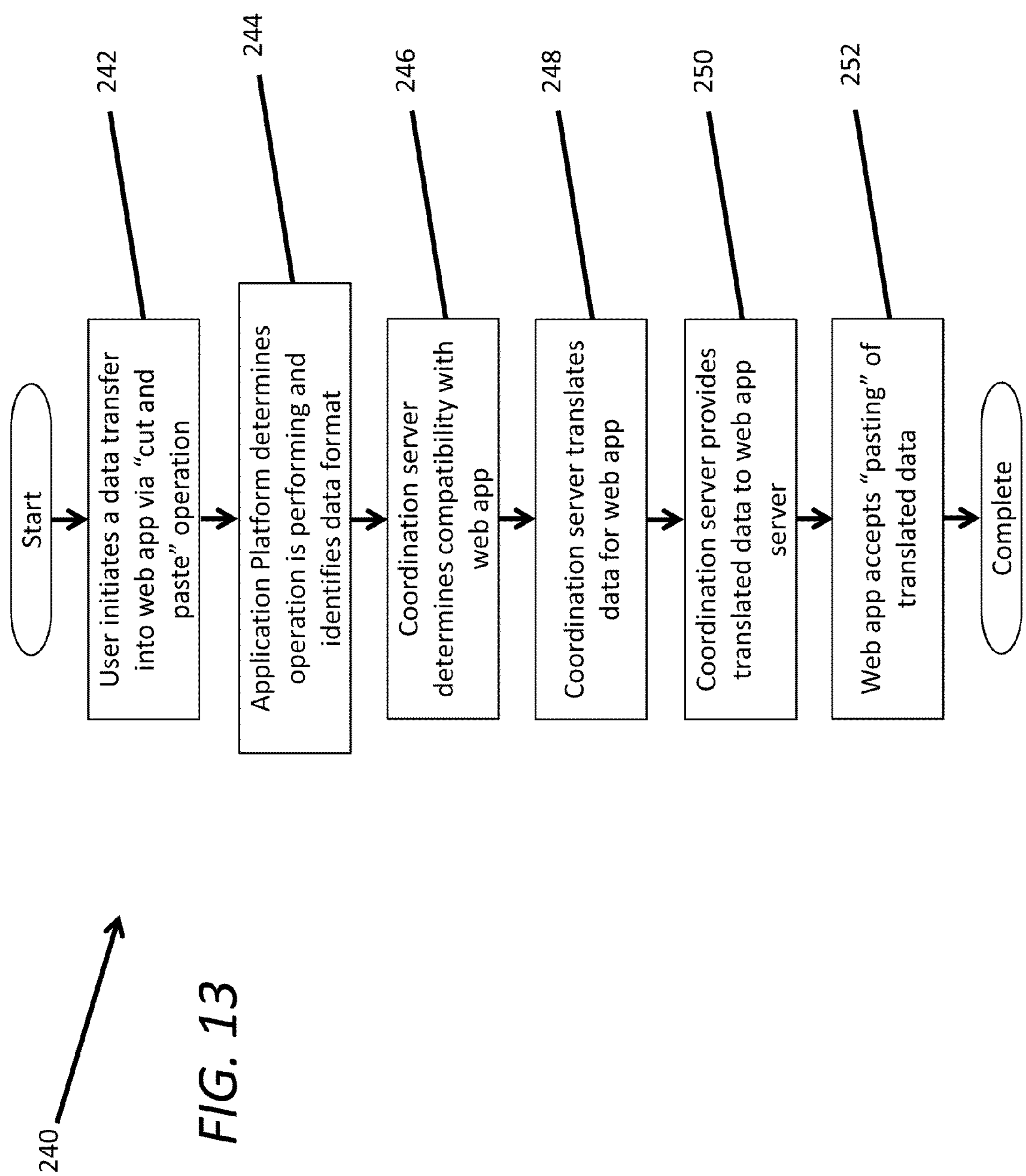
FIG. 13 is a flow chart illustrating a process for coordinating the transfer data of data between an application executing within a device's computing environment and a web application in accordance with an embodiment of the invention.

A process for translating and transferring data between a desktop application and a web application that is utilized to implement "cutting and pasting" functionality in accordance with an embodiment of the invention is illustrated in FIG. 13. Assuming that the "cutting and pasting" functionality of the web application has already been integrated into the user's computing environment using a cross-platform application, the process 240 for translating and transferring data commences when the user initiates (242) a data transfer via a "paste operation" that pastes native data into a web application via the browser. The client application determines (244) that a "paste" operation has been performed in the browser and identifies the data format of the data copied to the clipboard from within an application executing within a user's desktop computing environment. For example, the data may be an image file, a video file, an audio file, and/or text with complex formatting such as a formatted document or a spreadsheet. The coordination server inspects a configuration file of the web application to determine (246) whether the web application integration system is capable of translating the data into a format that is acceptable to the web application. Assuming the coordination server is capable of translating the data, the web application integration system translates (248) the data from the native format to a format that is acceptable to the web application. In several embodiments, the data translation is performed by the coordination server. In many embodiments, the translation is performed by the Application Platform application. In a number of embodiments, the data translation can be performed by a separate translation service. In some instances, the data received from the browser that is being passed to the web application has already been stripped of critical portions. In which case, the web application integration system may optionally utilize the client application to obtain the native data from the application executing within a user's desktop computing environment unmolested by the browser, and use this as the source of the translation.

The coordination server translates (248) the data and passes the data through the data chain from the application executing within a user's desktop computing environment and the browser into the web application. In several embodiments, the translated data may be separately submitted to the web application by the coordination server with instructions to use the translated data instead of the untranslated data received via the browser application.

Although a specific process associated with "pasting" data into a web application is illustrated in FIG. 13, other processes involving the transfer of data between an application executing within a user's desktop computing environment and a web application or vice versa can be utilized in accordance with embodiments of the invention.

11.2. Data Transfer Between Non-Related Web Applications

Figure 14:
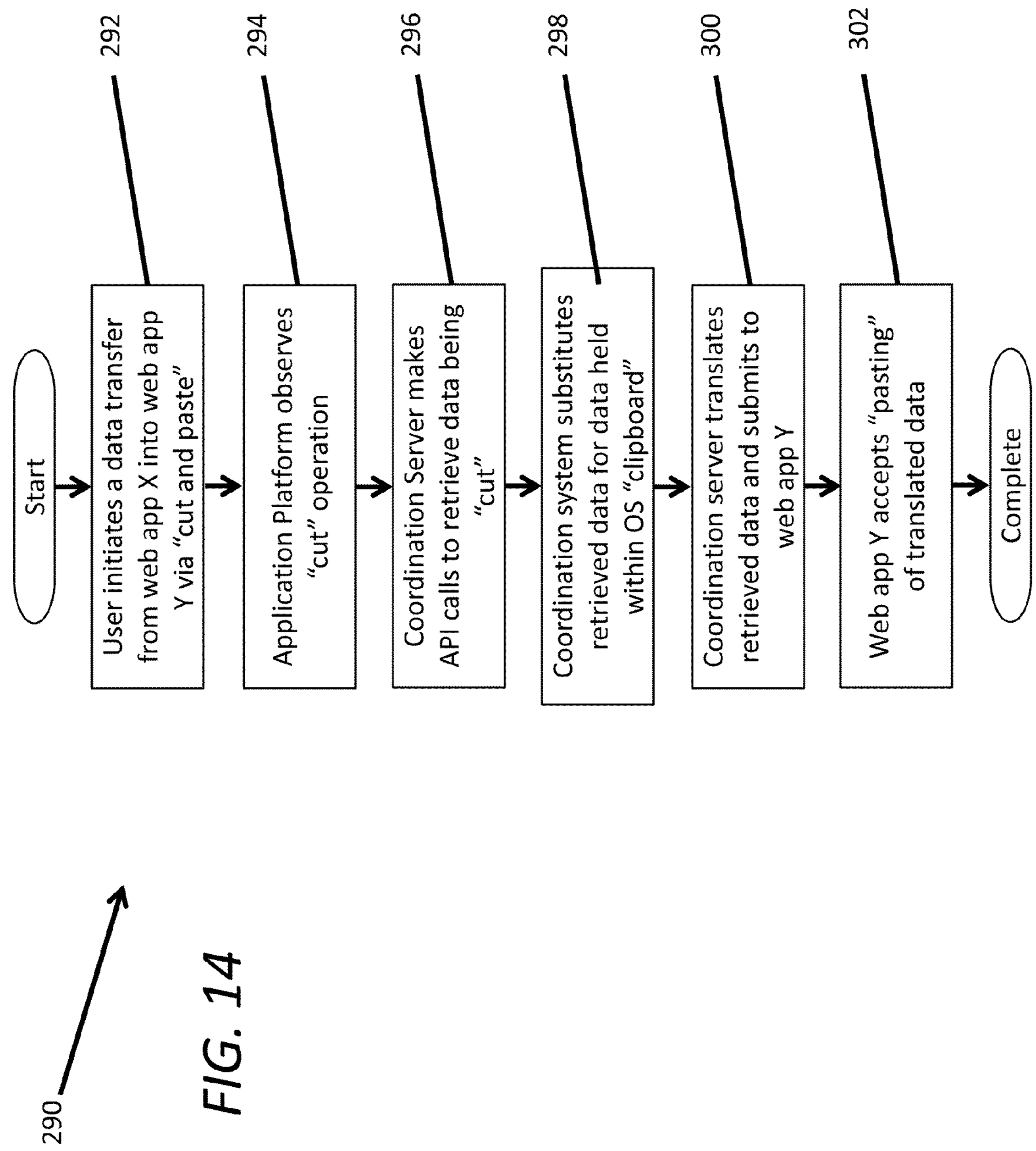
FIG. 14 is a flow chart illustrating a process for coordinating the transfer data of data between two web applications in accordance with an embodiment of the invention.

Coordination servers in accordance with embodiments of the invention can also facilitate the transfer of data between web applications. A process that can be utilized to transfer data between unrelated web applications in accordance with an embodiment of the invention is illustrated in FIG. 14. The process 290 commences when a user initiates (292) a transfer of data from a first web application X into a second web application Y. In the illustrated embodiment, the data transfer operation is a "cut and paste" operation. Although, similar processes can be utilized to facilitate other types of data transfer between unrelated web applications. The browser application is often incapable of "cutting" its internal representation of the data via the browser's native capabilities. In the illustrated embodiment, the "cut" operation being performed inside web application X is detected (294) by the client application, which determines based on the configuration file of web application X that the browser is incapable of transmitting the "cut" information to the native system clipboard. Based upon this determination, the coordination server obtains (296) the native data from web application X. In many embodiments, the native data is obtained via APIs provided by web application X for the purpose of integration with the web application integration system. The web application integration system substitutes (298) the retrieved data for data held within the clipboard system of the computing environment. The replacement can occur within the computing environment, if supported, or can occur during the paste phase of the operation by transferring the data directly to the server hosting web application Y. The "pasting" of the data can then proceed (300) in accordance with a translation process similar to the process 240 illustrated in FIG. 13. When the translated data has been presented to the web application Y in an acceptable format, web application Y accepts (302) the data and the process completes.

Although a specific process for intercepting data from a web application and then translating data for provision to another web application is illustrated in FIG. 14, other processes can be utilized to intercept data from a web application and translate the data for provision to a desktop or web application using a web application integration system in accordance with embodiments of the invention.

12. Rapid Device Configuration

As noted above, a verification server in accordance with embodiments of the invention can store a user profile containing information concerning all of the cross-platform applications that the user has installed on a particular computing device or domain of computing devices. In several embodiments, the user profile can be used to rapidly configure the computing environment of a computing device. Environment recreation on a new computing device can take a considerable amount of time. An Application Platform application installed on a new computing device can rapidly install all of the cross-platform applications associated with a user's profile to automatically configure the user's new computing environment. The user's profile can be stored on a remote server system such as (but not limited to) a verification server or a portable storage device such as a USB drive. In many instances, the new computing device may utilize a different operating system and/or possess different capabilities to the computing device that formed the basis of the profile. Once the Application Platform application is installed on the computing device, many of the same cross-platform applications can be installed on the new computing device (there may be limitations where specific hardware utilized by the cross-platform application, such as a camera, is not present).

Figure 15:
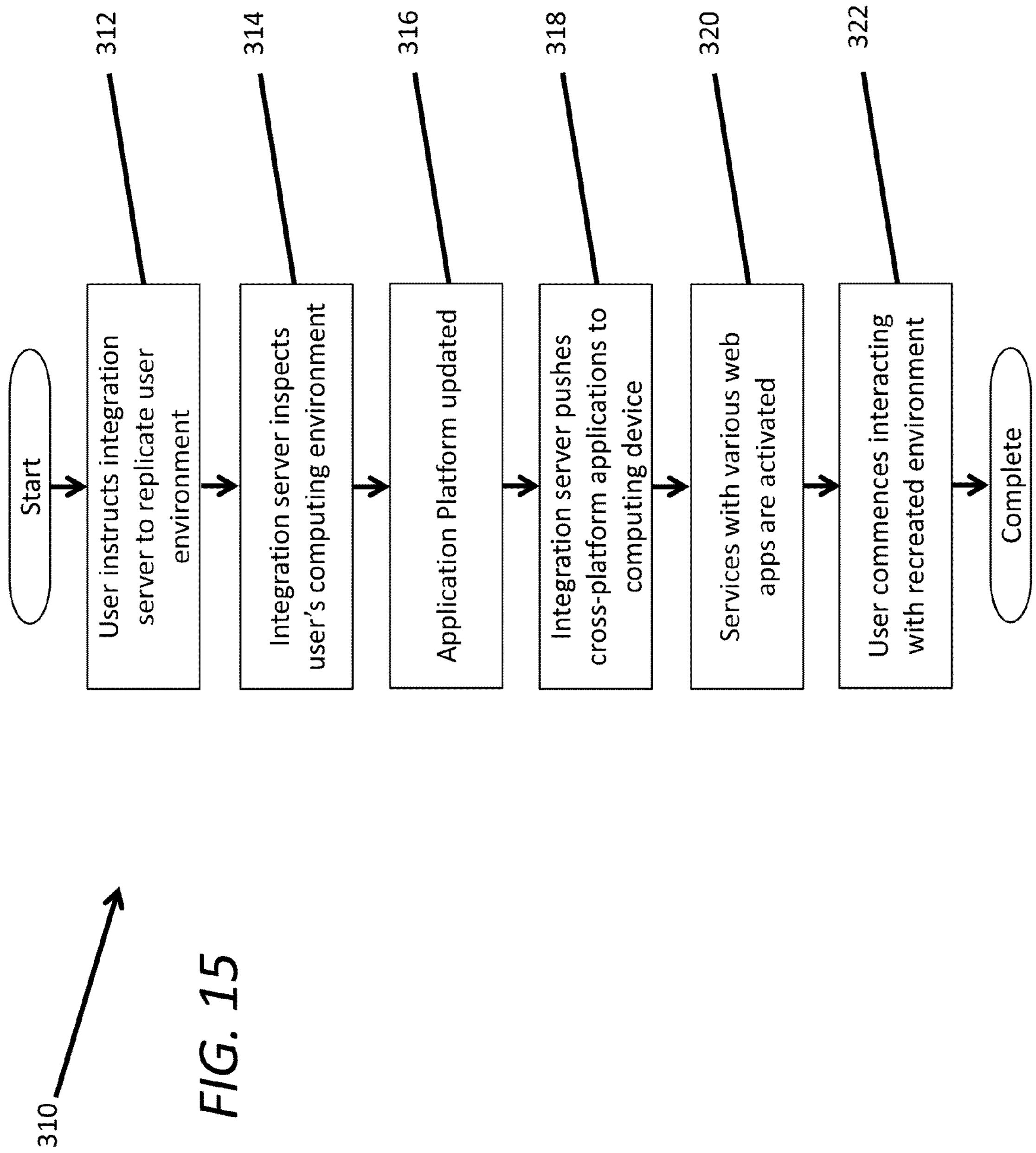
FIG. 15 is a flow chart illustrating a process for customizing the computing environment of a computing device using cross-platform applications downloaded from a verification server in accordance with an embodiment of the invention.

A process for configuring the computing environment of a new computing device in accordance with a profile of cross-platform applications that a user has installed on other devices in accordance with an embodiment of the invention is illustrated in FIG. 15. The process 310 commences when the user instructs (312) a verification server to recreate the user's computing environment on a new computing device. The verification server inspects (314) the computing environment of the new computing device to determine the current version of the Application Platform installed on the device (if at all) and any cross-platform applications that are already installed on the device. The Application Platform is then installed (316) or updated and the verification server then pushes (318) cross-platform applications to the computing device to configure the computing environment of the new device to be as close as possible to the desired computing environment, subject to the constraints of the new computing device. In many embodiments, the cross-platform applications can be automatically authorized (320) to access user accounts on web services using via the Application Platform, and the user can commence interacting (322) with the newly configured computing environment of the new computing device.

Although a specific process for configuring a computing device is illustrated in FIG. 15, alternative process involving the installation of cross-platform applications on a computing device in a configuration corresponding to a desired configuration can be utilized in accordance with embodiments of the invention.

While the above description contains many specific embodiments of the invention, these should not be construed as limitations on the scope of the invention, but rather as an example of one embodiment thereof. For example, the functionality of applications enabled by a Application Platform in accordance with embodiments of the invention is not limited to the specific examples described above. As can be appreciated, when an Application Platform creates a runtime environment that supports the execution of cross-platform applications implemented using web technologies any user interface or functionality that can be achieved in a web application can be achieved in a cross-platform application executing on top of the Application Platform in accordance with an embodiment of the invention. In addition, the integration of an application in accordance with an embodiment of the invention is only limited by the extent to which an operating system supports manipulation of a user's computing environment. Furthermore, while the discussion above references current technologies for implementing cross-platform applications including but not limited to web technologies, embodiments of the invention are not limited to current technologies and it is contemplated that cross-platform applications can be constructed using as yet undeveloped technologies including (but not limited to) technologies that will be utilized in the creation of future web applications. Accordingly, the scope of the invention should be determined not by the embodiments illustrated, but by the appended claims and their equivalents.

What is claimed is:

1. A computing device configured to execute a cross-platform application, comprising:

a computing device on which an operating system is installed that creates a computing environment, the computing device comprising local storage;

an Application Platform application, where the Application Platform application is at least partially natively implemented and creates an application runtime environment when executed by the computing device, the Application Platform application comprising:

a rendering engine process configured to:

render pages within the computing environment created by the operating system by interpreting instructions written in a rendering language; and implement a virtual machine configured to execute instructions written in a scripting language; and an integration process configured to enable the cross-platform application to communicate with operating system processes;

a cross-platform application, where the cross-platform application is configured to be executed within the application runtime environment, is not natively executable by the computing device, and comprises:

a text file containing instructions for rendering the cross-platform application in a rendering language configured to be rendered by the Application Platform application; and a text file containing a background page comprising the logic of the cross-platform application written in a scripting language configured to be executed within the application runtime environment created by the Application Platform application;

wherein the Application Platform application is configured to integrate the cross-platform application into the computing environment of the computing device by providing at least one launch point for the cross-platform application within the computing environment using the integration process; and wherein the Application Platform application is configured to cache a local version of a portion of the cross-platform application using the local storage so that the cross-platform application can be executed in the absence of a network connection.

2. The computing device of claim 1, wherein:

the computing environment is a desktop computing environment that includes a task bar; and at least one launch point is an icon in the taskbar of the desktop computing environment.

3. The computing device of claim 2, wherein:

the Application Platform application is configured to communicate with the operating system to add a badge to the at least one launch point for the cross-platform application within the desktop computing environment; and the cross-platform application executing within the runtime environment is configured to utilize the Application Platform application to add a badge notification to the launch point for the cross-platform application within the desktop computing environment.

4. The computing device of claim 1, wherein:

the Application Platform application is configured to render pop up notifications within the desktop computing environment; and the cross-platform application executing within the runtime environment is configured to utilize the Application Platform application to generate a pop up notification.

5. The computing device of claim 1, wherein:

the Application Platform application is configured to render pop up notifications using the rendering engine process, where pop up notification contains a web page rendered by a chromeless web browser application; and the cross-platform application executing within the runtime environment is configured to utilize the Application Platform application to generate a pop up notification containing a web page rendered by the chromeless web browser.

6. The computing device of claim 5, wherein the cross-platform application comprises at least one file containing instructions for rendering a pop up notification in a rendering language configured to be rendered by the Application Platform application.

7. The computing device of claim 6, wherein the integration process is further configured to enable the cross-platform application to communicate with natively implemented processes executing on the computing device.

8. The computing device of claim 7, wherein the integration process is configured to expose application programming interfaces (APIs) that enable the cross-platform application to make modifications to the computing environment.

9. The computing device of claim 8, wherein the Application Platform application is configured to generate a hash based on at least one of the files containing the logic of the cross-platform application and the at least one file containing instructions for rendering a pop up notification and to provide the hash to a verification server.

10. The computing device of claim 9, wherein the Application Platform application is configured to disable the cross-platform application in response to an instruction from the verification server.

11. The computing device of claim 9, wherein the Application Platform application is configured to initiate installation of an updated version of the cross-platform application in response to an instruction from the verification server.

12. The computing device of claim 8, wherein the cross-platform application is configured to share data with other processes running within the computing environment using the APIs and the local storage.

13. The computing device of claim 6, wherein:

the cross-platform application further comprises an image file containing an icon; and the Application Platform application is configured to display the icon as a launch point within the computing environment of the computing device.

14. The computing device of claim 13, wherein the Application Platform application is configured to apply a badge to the icon launch point in response to instructions in the file containing the logic of the cross-platform application.

15. The computing device of claim 13, wherein the Application Platform application is configured to apply a badge to the icon launch point in response to instructions in one of the at least one files containing instructions for rendering a pop up notification.

16. The computing device of claim 13, wherein the Application Platform application is configured to continuously execute the background page of the cross-platform application.

17. The computing device of claim 16, wherein the Application Platform application is configured to bring the cross-platform application to the foreground of the computing environment upon receiving an interaction with the launch point of the cross-platform application within the computing environment.

18. The computing device of claim 6, wherein the file containing the logic of the cross-platform application and the at least one file containing instructions for rendering a pop up notification share a local storage context when executed by the Application Process application.

19. The computing device of claim 5, wherein the cross-platform application executing within the runtime environment is configured to pass a URL to the Application Platform application to render a pop up notification containing a web page rendered by the chromeless web browser using the URL.

20. The computing device of claim 19, wherein:

the Application Platform application is configured to monitor URL changes in the chromeless web browser and to extract an access token from one of the URLs returned to the chromeless web browser by a remote server; and the Application Platform application is configured to locally store the access token.

21. The computing device of claim 1, wherein:

the Application Platform application is configured to monitor uniform resource locator (URL) changes in the chromeless web browser and to extract an access token from one of the URLs returned to the chromeless web browser by a remote server; and the Application Platform application is configured to locally store the access token.

22. The computing device of claim 1, wherein the computing device includes a processor and non-volatile storage and the Application Platform application and the cross-platform application are stored in the non-volatile storage of the computing device.

23. The computing device of claim 1, wherein the Application Platform application is configured to continuously execute the cross-platform application.

24. The computing device of claim 1, wherein the Application Platform application is configured to display a listing of cross-platform applications that can be installed on the computing device.

25. The computing device of claim 24, wherein the Application Platform application is configured to execute a cross-platform application to display the listing of cross-platform applications that can be installed on the computing device.

26. The computing device of claim 1, wherein the Application Platform application is configured to coordinate the installation of a second cross-platform application on the computing device.

27. The computing device of claim 26, wherein the Application Platform application is configured to verify the authenticity of the cross-platform application with a verification server prior to installing the second cross-platform application.

28. The computing device of claim 1, wherein the Application Platform application is configured to verify itself with a verification server.

29. The computing device of claim 28, wherein the Application Platform application is configured to disable itself when instructed to by the verification server.

30. The computing device of claim 28, wherein the Application Platform application is configured to initiate the installation of an updated version of the Application Platform application when instructed to by the verification server.

31. The computing device of claim 1, wherein the Application Platform application is configured to verify the cross-platform application with a verification server.

32. The computing device of claim 31, wherein the Application Platform application is configured to disable the cross-platform application when instructed to by the verification server.

33. The computing device of claim 31, wherein the Application Platform application is configured to initiate the installation of an updated version of the cross-platform application when instructed to by the verification server.

34. The computing device of claim 1, wherein the Application Platform application is configured to enable cross-platform applications executing within the runtime environment to access the local storage.

35. The computing device of claim 34, wherein each cross-platform application has its own storage domain in the local storage.

36. The computing device of claim 1, wherein the Application Platform application is configured to coordinate data transfer between an application executing within the computing environment of the computing device and a web application via a coordination server.

37. The computing device of claim 1, where the Application Platform application is configured to configure the computing environment of the computing device by coordinating the installation of a plurality of cross-platform applications in response to instructions from a verification server.

38. The computing device of claim 1, wherein:

the computing device further comprises at least one hardware device; and the integration process is configured to provide an API to the cross-platform application allowing access to the at least one hardware device.

39. The computing device of claim 1, wherein:

the computing device further comprises a network device configured to obtain data via a network connection;

the cross-platform application further comprises at least one reference to assets stored on a third-party server system separate from the computing device; and the Application Platform application is configured to retrieve the assets identified by the reference via the network connection.

40. The computing device of claim 1, wherein:

the Application Platform application is configured to store login and password information using the local storage; and the cross-platform application is configured to utilize the stored login and password information to access resources utilized in the execution of the cross-platform application.

* * * * *